US011197251B2

(12) United States Patent
Gheorghiu et al.

(10) Patent No.: US 11,197,251 B2
(45) Date of Patent: Dec. 7, 2021

(54) TECHNIQUES AND APPARATUSES FOR SYNCHRONIZATION, SCHEDULING, BANDWIDTH ALLOCATION, AND REFERENCE SIGNAL TRANSMISSION IN A 5TH GENERATION NETWORK

(71) Applicant: QUALCOMM Incorporated, San Diego, CA (US)

(72) Inventors: Valentin Alexandru Gheorghiu, Tokyo (JP); Peter Gaal, San Diego, CA (US); Masato Kitazoe, Hachiouji (JP)

(73) Assignee: QUALCOMM Incorporated, San Diego, CA (US)

( * ) Notice: Subject to any disclaimer, the term of this patent is extended or adjusted under 35 U.S.C. 154(b) by 414 days.

(21) Appl. No.: 15/601,727

(22) Filed: May 22, 2017

(65) Prior Publication Data
US 2018/0132200 A1    May 10, 2018

Related U.S. Application Data

(60) Provisional application No. 62/417,707, filed on Nov. 4, 2016.

(51) Int. Cl.
*H04W 56/00* (2009.01)
*H04W 8/14* (2009.01)
(Continued)

(52) U.S. Cl.
CPC ......... *H04W 56/0005* (2013.01); *H04W 8/14* (2013.01); *H04W 28/20* (2013.01);
(Continued)

(58) Field of Classification Search
CPC ............. H04W 28/20; H04W 56/0005; H04W 56/0015; H04W 72/1289; H04W 88/027;
(Continued)

(56) References Cited

U.S. PATENT DOCUMENTS

2005/0170839 A1 * 8/2005 Rinne .................. H04W 16/12
455/446
2008/0242224 A1   10/2008 Fratti et al.
(Continued)

FOREIGN PATENT DOCUMENTS

CN    WO2005076647    *  8/2005 ............ H04W 16/02
CN       101860914 A      10/2010
(Continued)

OTHER PUBLICATIONS

Huawei., et al., "Channel Raster Design," 3GPP Draft; R1-160313, 3rd Generation Partnership Project (3GPP), Mobile Competence Centre; 650, Route Des Lucioles; F-06921 Sophia-Antipolis Cedex; ; France; vol. RAN WG1, No. St Julian's, Malta; 20160215-20160219; Feb. 14, 2016 (Feb. 14, 2016), 3 pages, XP051053653, Retrieved from the Internet: URL: http://www.3gpp.org/ftp/Meetings_3GPP_SYNC/RAN1/Docs/ [retrieved on Feb. 14, 2016].
(Continued)

*Primary Examiner* — Edan Orgad
*Assistant Examiner* — Malick A Sohrab
(74) *Attorney, Agent, or Firm* — Qualcomm Incorporated

(57) ABSTRACT

As wireless communication technology advances, the bandwidth usage of wireless communications systems becomes increasingly flexible. For example, different user equipment (UEs) may support different bandwidths or radio frequency capabilities. However, a scheduling entity may not know wireless capabilities or characteristics (e.g., supported bandwidths, RF chain configurations, reconfiguration times, and/or the like) of the UEs for which the scheduling entity is to manage communications, which may hamper the ability of the scheduling entity to take advantage of the advances in flexible bandwidth usage described above. Techniques for synchronization, scheduling, bandwidth allocation, and reference signal transmission in a wireless communications
(Continued)

system associated with flexible bandwidth allocation, such as a 5G network, are described herein.

30 Claims, 20 Drawing Sheets

(51) Int. Cl.
*H04W 28/20* (2009.01)
*H04W 72/04* (2009.01)
*H04W 72/12* (2009.01)
*H04W 74/08* (2009.01)
*H04W 88/02* (2009.01)

(52) U.S. Cl.
CPC ... *H04W 56/0015* (2013.01); *H04W 72/0426* (2013.01); *H04W 72/1263* (2013.01); *H04W 72/1289* (2013.01); *H04W 74/0891* (2013.01); *H04W 88/027* (2013.01)

(58) Field of Classification Search
CPC ......... H04W 74/0891; H04W 72/1263; H04W 72/0426; H04W 8/14
See application file for complete search history.

(56) References Cited

U.S. PATENT DOCUMENTS

| | | | | |
|---|---|---|---|---|
| 2008/0304581 A1* | 12/2008 | Bykovnikov | ....... | H04L 27/2602 375/260 |
| 2011/0085448 A1* | 4/2011 | Kuwahara | ............. | H04W 16/10 370/242 |
| 2012/0076091 A1* | 3/2012 | Seok | .................. | H04W 74/006 370/329 |
| 2014/0254583 A1 | 9/2014 | Choi et al. | | |
| 2014/0370905 A1* | 12/2014 | Kim | ...................... | H04W 28/04 455/450 |
| 2015/0063216 A1* | 3/2015 | Ngai | ...................... | H04W 36/24 370/329 |
| 2015/0264681 A1* | 9/2015 | Vadlamudi | ........ | H04W 72/0446 455/452.1 |
| 2015/0334659 A1* | 11/2015 | Dimou | .............. | H04W 52/0206 370/311 |
| 2015/0341148 A1* | 11/2015 | Kazmi | .................. | H04L 5/0098 370/252 |
| 2016/0127096 A1* | 5/2016 | Lee | ........................ | H04B 7/068 375/267 |
| 2016/0174200 A1* | 6/2016 | Seok | ..................... | H04W 72/04 370/329 |
| 2016/0316442 A1* | 10/2016 | Seo | ......................... | H04W 76/14 |
| 2017/0273070 A1* | 9/2017 | Yi | ............................ | H04L 5/001 |
| 2018/0006774 A1* | 1/2018 | Yiu | ......................... | H04L 5/001 |
| 2018/0007712 A1* | 1/2018 | Lou | ..................... | H04W 74/006 |
| 2018/0124744 A1* | 5/2018 | Xue | ..................... | H04W 72/042 |
| 2018/0192354 A1* | 7/2018 | Yi | .......................... | H04W 48/16 |
| 2020/0028726 A1* | 1/2020 | Karlsson | ............... | H04L 5/0048 |
| 2020/0045671 A1* | 2/2020 | Hapsari | ................. | H04W 68/02 |
| 2020/0305123 A1* | 9/2020 | Takeda | ................. | H04B 1/7143 |

FOREIGN PATENT DOCUMENTS

| | | |
|---|---|---|
| CN | 102300158 A | 12/2011 |
| CN | 103024834 A | 4/2013 |
| CN | 103260242 A | 8/2013 |
| CN | 103402251 A | 11/2013 |
| CN | 104244420 A | 12/2014 |
| WO | 2016070427 A1 | 5/2016 |

OTHER PUBLICATIONS

Huawei., et al., "Synchronization Signal Design," 3GPP Draft; R1-160311, 3rd Generation Partnership Project (3GPP), Mobile Competence Centre; 650, Route Des Lucioles; F-06921 Sophia-Antipolis Cedex; France; vol. RAN WG1, No. St Julian's, Malta; 20160215-20160219; Feb. 14, 2016 (Feb. 14, 2016), 10 pages, XP051053651, Retrieved from the Internet: URL:http://www.3gpp.org/ftp/Meetings_3GPP_SYNC/RAN1/Docs/ [retrieved on Feb. 14, 2016], the whole document.
Nokia Networks., et al., "Discussion on Channel Raster for NB-IoT," 3GPP Draft; R1-160448, 3rd Generation Partnership Project (3GPP), Mobile Competence Centre; 650, Route Des Lucioles; F-06921 Sophia-Antipolis Cedex; France; vol. RAN WG1, No. St Julian's, Malta; 20160215-20160219; Feb. 14, 2016 (Feb. 14, 2016), 8 pages, XP051053784, Retrieved from the Internet: URL:http://www.3gpp.org/ftp/Meetings_3GPP_SYNC/RAN1/Docs/[retrieved on Feb. 14, 2016], the whole document.
Partial International Search Report—PCT/US2017/055388—ISA/EPO—dated Dec. 15, 2017.
International Search Report and Written Opinion—PCT/US2017/055388—ISA/EPO—dated Jun. 21, 2018.
International Search Report and Written Opinion—PCT/US2017/055388—ISA/EPO—dated Feb. 8, 2018.

* cited by examiner

TECHNIQUES AND APPARATUSES FOR SYNCHRONIZATION, SCHEDULING, BANDWIDTH ALLOCATION, AND REFERENCE SIGNAL TRANSMISSION IN A 5TH GENERATION NETWORK

CROSS-REFERENCE TO RELATED APPLICATION UNDER 35 U.S.C. § 119

This application claims priority to Provisional Patent Application No. 62/417,707, filed Nov. 4, 2016, entitled "Techniques and Apparatuses for Synchronization, Scheduling, Bandwidth Allocation, and Reference Signal Transmission in a 5th Generation Network," which is hereby expressly incorporated by reference herein.

TECHNICAL FIELD

The following relates generally to wireless communication, and more specifically to techniques and apparatuses for synchronization, scheduling, bandwidth allocation, and reference signal transmission in a 5th generation network.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, a New Radio (NR) system, a 5th Generation (5G) system, etc.). A wireless multiple-access communications system may include a number of base stations, each simultaneously supporting communication for multiple communication devices, which may be otherwise known as user equipment (UE).

As wireless communication technology advances, the bandwidth usage of wireless communications systems becomes increasingly flexible. For example, some wireless communications systems may employ a wide band channel access scheme, in which communications with UEs are scheduled within different portions of a channel according to radio frequency (RF) chain capabilities of the UEs, bandwidths supported by the UEs, and/or other considerations. In such a case, different UEs may support different bandwidths of a channel (e.g., a wide band channel). A particular UE may support a particular sub-band of the channel based at least in part on categories or capabilities of the particular UE (e.g., according to a maximum bandwidth supported by the particular UE or a range of frequencies in which the particular UE can communicate). For example, operations of the particular UE may be confined within the particular sub-band. Additionally, or alternatively, the particular UE may be associated with at least one RF chain. Moreover, a UE may be reconfigured from a first sub-band to a second sub-band dynamically and/or on as short a time scale as possible to enable power savings and adequate usage of spectrum.

However, a scheduling entity may not know wireless capabilities or characteristics (e.g., supported bandwidths, RF chain configurations, reconfiguration times, and/or the like) of the UEs for which the scheduling entity is to manage communications, which may hamper the ability of the scheduling entity to take advantage of the advances in flexible bandwidth usage described above. Therefore, it may be advantageous to a scheduling entity (e.g., a network device of the wireless communications system, such as a base station or a UE) to efficiently obtain information identifying the wireless capabilities of UEs associated with the scheduling entity, and to obtain information relating to the wireless capabilities and/or one or more channels associated with the scheduling entity. For example, when a UE supports a particular sub-band using multiple RF chains, it may be advantageous for scheduling purposes to know an RF chain capability of the UE (e.g., so that single-carrier orthogonal frequency division multiplexing (OFDM) and phase continuity can be properly configured in view of the RF chain capability). As another example, it may be advantageous to the scheduling entity to know a length of time associated with reconfiguration of a UE from a first bandwidth to a second bandwidth so that the scheduling entity can properly schedule reconfiguration of the UE.

Furthermore, when UEs are associated with different channel bandwidths, a traditional approach to synchronization signaling (e.g., using a synchronization channel broadcasted in a center frequency of the channel) may not work for all of the UEs. For example, a UE may not be capable of communicating on the center frequency of the channel, which may render the synchronization signaling unusable to the UE.

Still further, the increasingly flexible usage of bandwidth may mean that traditional reference signaling approaches are no longer effective or efficient for identification of channel measurements. For example, a scheduling entity may need channel measurements for many different sub-bands or channels, and UEs may not simultaneously be operating in all of the sub-bands or channels when the channel measurements are needed. This may lead to gaps in channel measurement.

SUMMARY

Aspects of the present disclosure provide methods and apparatuses for synchronization, scheduling, bandwidth allocation, and reference signal transmission in a network associated with flexible bandwidth allocation, such as a 5G network. For example, a network device (e.g., a base station, eNB, or scheduling entity) may transmit at least two synchronization signals in a channel associated with the network device, wherein at least one synchronization signal, of the at least two synchronization signals, is transmitted in one or more sub-channels of the channel that are not located at a frequency center of the channel. In some aspects, the one or more sub-channels may be selected to be within bandwidths supported by UEs associated with the network device. In this way, the network device may provide synchronization signals for UEs that do not support a bandwidth at a frequency center of the channel, which increases the flexibility of bandwidth support and allocation for UEs. Thus, throughput and flexibility of a network (e.g., a 5G network and/or the like) may be improved.

Additionally, or alternatively, the network device may receive information identifying an RF chain capability of a UE and at least one parameter relating to the RF chain capability, and may use the information to schedule or demodulate communications with the UE. For example, the RF chain capability may identify a quantity of RF chains associated with the UE, one or more bandwidth capabilities of the UE, a multiple-input multiple-output configuration of the UE, an advanced receiver configuration of the UE, and/or the like. In some aspects, the network device may schedule a bandwidth change according to a length of time associated with a bandwidth reconfiguration of the UE, which may permit the network device to properly or more efficiently schedule dynamic reconfiguration of bandwidth of the UE. Additionally, or alternatively, the network device may schedule single carrier OFDM according to the RF chain capability, which may reduce negative effects associated with the RF chain capability.

Additionally, or alternatively, the network device may receive reference signals that are simultaneously transmitted by a plurality of antennas of a UE. In such a case, the network device may schedule the UE to transmit a reference signal in at least one sub-band of a channel, wherein the at least one sub-band is different from a sub-band being used by the UE for data transmission. By simultaneously transmitting reference signals on a plurality of antennas, the UE may increase a quantity of channels or sub-bands for which channel measurements can be simultaneously determined. Also, by configuring the UE to transmit the reference signal in a sub-band other than one used for data transmission, the network device further increases a quantity of channels or sub-bands for which channel measurements can be simultaneously determined. Thus, the flexibility of the network (e.g., a 5G network and/or the like) is improved.

A method of wireless communication is described. The method may include identifying, by a network device, a channel that supports communications with a set of user equipment (UEs), wherein at least two UEs, of the set of UEs, support different bandwidths on the channel. The method may include transmitting, by the network device, at least two synchronization signals, wherein at least one synchronization signal, of the at least two synchronization signals, is transmitted in one or more sub-channels of the channel that are not located at a frequency center of the channel to permit the at least two UEs to receive the at least one synchronization signal.

An apparatus for wireless communication is described. The apparatus may include means for identifying a channel that supports communications with a set of UEs, wherein at least two UEs, of the set of UEs, support different bandwidths on the channel. The apparatus may include means for transmitting at least two synchronization signals, wherein at least one synchronization signal, of the at least two synchronization signals, is transmitted in one or more sub-channels of the channel that are not located at a frequency center of the channel to permit the at least two UEs to receive the at least one synchronization signal.

A network device may include a memory and one or more processors coupled to the memory. The one or more processors may be configured to identify a channel that supports communications with a set of UEs, wherein at least two UEs, of the set of UEs, support different bandwidths on the channel. The one or more processors may be configured to transmit at least two synchronization signals, wherein at least one synchronization signal, of the at least two synchronization signals, is transmitted in one or more sub-channels of the channel that are not located at a frequency center of the channel to permit the at least two UEs to receive the at least one synchronization signal.

A non-transitory computer-readable medium may store one or more instructions that, when executed by one or more processors of a network device, cause the one or more processors to identify a channel that supports communications with a set of UEs, wherein at least two UEs, of the set of UEs, support different bandwidths on the channel. The one or more instructions, when executed by the one or more processors of the network device, cause the one or more processors to transmit at least two synchronization signals, wherein at least one synchronization signal, of the at least two synchronization signals, is transmitted in one or more sub-channels of the channel that are not located at a frequency center of the channel to permit the at least two UEs to receive the at least one synchronization signal.

A method of wireless communication is described. The method may include receiving, by a network device and from a UE, information identifying a radio frequency (RF) chain capability of the UE and at least one parameter related to the RF chain capability. The method may include using, by the network device, the information to schedule communications with the UE or to demodulate communications with the UE.

An apparatus for wireless communication is described. The apparatus may include means for receiving, from a UE, information identifying an RF chain capability of the UE and at least one parameter related to the RF chain capability. The apparatus may include means for using the information to schedule communications with the UE or to demodulate communications with the UE.

A network device may include a memory and one or more processors coupled to the memory. The one or more processors may be configured to receive, from a UE, information identifying an RF chain capability of the UE and at least one parameter related to the RF chain capability. The one or more processors may be configured to use the information to schedule communications with the UE or to demodulate communications with the UE.

A non-transitory computer-readable medium may store one or more instructions that, when executed by one or more processors of a network device, cause the one or more processors to receive, from a UE, information identifying an RF chain capability of the UE and at least one parameter related to the RF chain capability. The one or more instructions, when executed by the one or more processors of the network device, cause the one or more processors to use the information to schedule communications with the UE or to demodulate communications with the UE.

A method of wireless communication is described. The method may include receiving, by a network device, reference signals simultaneously transmitted by a set of antennas of a UE. The method may include scheduling, by the network device, the UE to transmit a reference signal in at least one sub-band of a channel, wherein the at least one sub-band is different from a sub-band being used by the UE for data transmission.

An apparatus for wireless communication is described. The apparatus may include means for receiving reference signals simultaneously transmitted by a set of antennas of a UE. The apparatus may include means for scheduling the UE to transmit a reference signal in at least one sub-band of a channel, wherein the at least one sub-band is different from a sub-band being used by the UE for data transmission.

A network device may include a memory and one or more processors coupled to the memory. The one or more processors may be configured to receive reference signals simultaneously transmitted by a set of antennas of a UE. The one or more processors may be configured to schedule the UE to transmit a reference signal in at least one sub-band of a channel, wherein the at least one sub-band is different from a sub-band being used by the UE for data transmission.

A non-transitory computer-readable medium may store one or more instructions that, when executed by one or more processors of a network device, cause the one or more processors to receive reference signals simultaneously transmitted by a set of antennas of a UE. The one or more instructions, when executed by the one or more processors of the network device, cause the one or more processors to schedule the UE to transmit a reference signal in at least one sub-band of a channel, wherein the at least one sub-band is different from a sub-band being used by the UE for data transmission.

A method of wireless communication is described. The method may include transmitting, by a wireless communication device, RF chain information identifying an RF chain capability of the wireless communication device and at least one parameter related to the RF chain capability. The method may include receiving scheduling information identifying a particular sub-channel of a channel, wherein the channel supports communications with a plurality of wireless communication devices based at least in part on respective RF chain capabilities of the plurality of wireless communication devices. The method may include communicating on the particular sub-channel based at least in part on the scheduling information.

An apparatus for wireless communication is described. The apparatus may include means for transmitting RF chain information identifying an RF chain capability of the apparatus and at least one parameter related to the RF chain capability. The apparatus may include means for receiving scheduling information identifying a particular sub-channel of a channel, wherein the channel supports communications with a plurality of wireless communication devices based at least in part on respective RF chain capabilities of the plurality of wireless communication devices. The apparatus may include means for communicating on the particular sub-channel based at least in part on the scheduling information.

A wireless communication device may include a memory and one or more processors coupled to the memory. The one or more processors may be configured to transmit RF chain information identifying an RF chain capability of the wireless communication device and at least one parameter related to the RF chain capability; receive scheduling information identifying a particular sub-channel of a channel, wherein the channel supports communications with a plurality of wireless communication devices based at least in part on respective RF chain capabilities of the plurality of wireless communication devices; and/or communicate on the particular sub-channel based at least in part on the scheduling information.

A non-transitory computer-readable medium may store one or more instructions that, when executed by one or more processors of a wireless communication device, cause the one or more processors to transmit RF chain information identifying an RF chain capability of the wireless communication device and at least one parameter related to the RF chain capability; receive scheduling information identifying a particular sub-channel of a channel, wherein the channel supports communications with a plurality of wireless communication devices based at least in part on respective RF chain capabilities of the plurality of wireless communication devices; and/or communicate on the particular sub-channel based at least in part on the scheduling information.

Aspects generally include a method, apparatus, system, computer program product, non-transitory computer-readable medium, user equipment, network device, wireless communication device, and processing system as substantially described herein with reference to and as illustrated by the accompanying drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
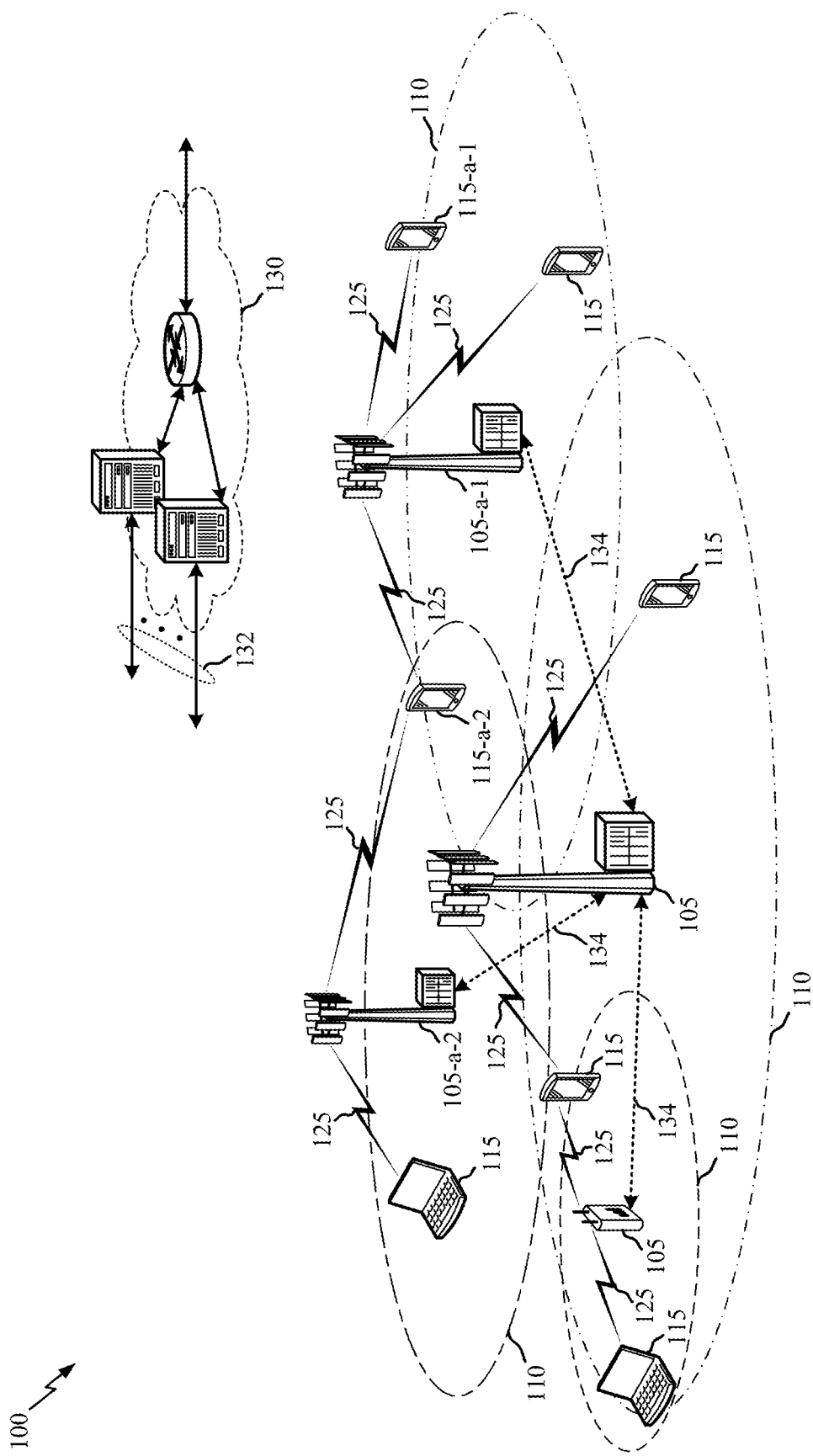
FIG. 1 illustrates an example of a system for wireless communication, in accordance with certain aspects of the present disclosure.

The detailed description set forth below in connection with the appended drawings is intended as a description of various configurations and is not intended to represent the configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

It is noted that while aspects may be described herein using terminology commonly associated with 3G and/or 4G wireless technologies, aspects of the present disclosure can be applied in other generation-based communication systems, such as 5G and later, including New Radio (NR) technologies (e.g., a New Radio (NR) shared spectrum (SS) system (SS-NR)).

FIG. 1 illustrates an example of a wireless communications system 100. The wireless communications system 100 includes base stations 105, user equipment (UEs) 115, and a core network 130. In some examples, the wireless communications system 100 operates over a shared spectrum. The shared spectrum may be unlicensed or partially licensed to one or more network operators. Access to the spectrum may be limited and may be controlled by a separate coordination entity. In some examples, the wireless communications system 100 may be a Long Term Evolution (LTE) or LTE-Advanced network. In yet other examples, the wireless communications system 100 may be a millimeter wave (mmW) system, a new radio (NR) system, a 5G system, or any other successor system to LTE.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115. UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

Base stations 105 may communicate with the core network 130 and with one another. The core network 130 may provide user authentication, access authorization, tracking, Internet Protocol (IP) connectivity, and other access, routing, or mobility functions. At least some of the base stations 105 (e.g., which may be an example of an evolved NodeB (eNB) or an access node controller (ANC)) may interface with the core network 130 through backhaul links 132 (e.g., S1, S2, etc.) and may perform radio configuration and scheduling for communication with the UEs 115. In various examples, the base stations 105 may communicate, either directly or indirectly (e.g., through core network 130), with each other over backhaul links 134 (e.g., X1, X2, etc.), which may be wired or wireless communication links.

Each base station 105 may also communicate with a number of UEs 115 through a number of other base stations 105, where base station 105 may be an example of a smart radio head. In alternative configurations, various functions of each base station 105 may be distributed across various base stations 105 (e.g., radio heads and access network controllers) or consolidated into a single base station 105.

In some examples, the wireless communications system 100 may be time-synchronized. In this way, different network operating entities may each operate at different time intervals within a frame of time, with each network operating entity being time-synchronized with other network operating entities. Traditionally (e.g., in an LTE network), a UE 115 attempting to access wireless communications system 100 may perform an initial cell search by detecting a primary synchronization signal (PSS) from a base station 105. The PSS may enable synchronization of slot timing and may indicate a physical layer identity value. The UE 115 may then receive a secondary synchronization signal (SSS). The SSS may enable radio frame synchronization, and may provide a cell identity value, which may be combined with the physical layer identity value to identify the cell. The SSS may also enable detection of a duplexing mode and a cyclic prefix length. Some systems, such as time division duplexing (TDD) systems, may transmit an SSS but not a PSS. Both the PSS and the SSS may be located in a central portion of a carrier, respectively.

In some aspects, such as aspects described herein, the base station 105 may transmit a synchronization signal on a single frequency of a channel (e.g., a single frequency for an entire channel) that may be located in a central portion of the channel, or may be located elsewhere in the channel. Additionally, or alternatively, as described elsewhere herein, the base station 105 may transmit one or more synchronization signals in multiple, different sub-bands or sub-channels that may be used by UEs with narrow RF chain capabilities or supported bandwidths.

After receiving the synchronization signal or the one or more synchronization signals (e.g., the PSS and SSS, or another synchronization signal), the UE 115 may receive a master information block (MIB), which may be transmitted in the physical broadcast channel (PBCH). The MIB may contain system bandwidth information, a system frame number (SFN), and a Physical Hybrid-ARQ Indicator Channel (PHICH) configuration. After decoding the MIB, the UE 115 may receive one or more system information blocks (SIGs). For example, SIB1 may contain cell access parameters and scheduling information for other Ms. Decoding SIB1 may enable the UE 115 to receive SIB2. SIB2 may contain RRC configuration information related to random access channel (RACH) procedures, paging, physical uplink control channel (PUCCH), physical uplink shared channel (PUSCH), power control, sounding reference signal (SRS) (e.g., one or more SRSs to be transmitted by one or more antennas of the UE 115), and cell barring.

As indicated above, FIG. 1 is provided as an example. Other examples are possible and may differ from what was described above in connection with FIG. 1.

Figure 2:
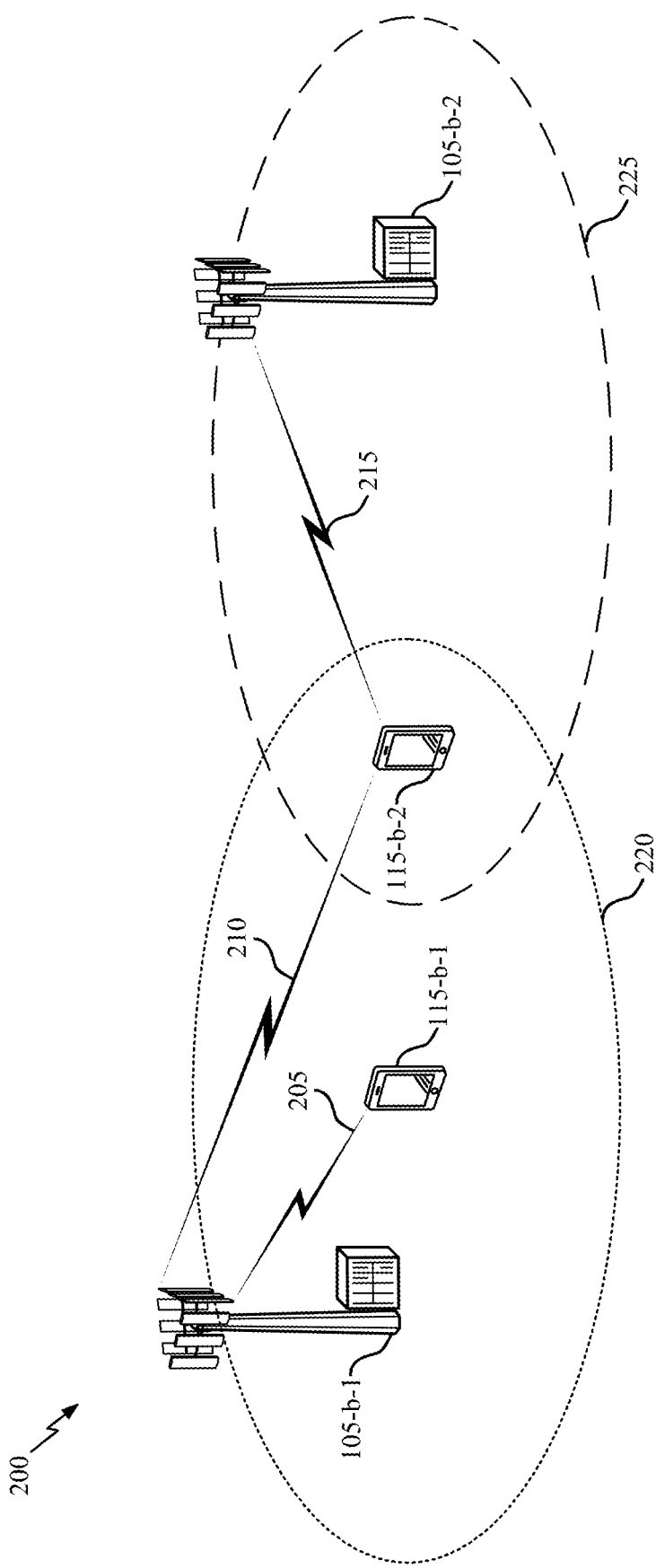
FIG. 2 illustrates an example of an access network that shares network resources, in accordance with certain aspects of the present disclosure.

FIG. 2 illustrates an example of an access network 200 that shares network resources, such as bandwidth of a wide band channel of an NR or 5G system. Access network 200 may include a base station 105-*b*-1, a base station 105-*b*-2, a UE 115-*b*-1, and a UE 115-*b*-2, which may be examples of the corresponding devices described with reference to FIG. 1. Base station 105-*b*-1 and base station 105-*b*-2 may communicate with UEs 115 or other wireless devices within their respective coverage areas 220 and 225 based at least in part on allocating sub-bands or sub-channels of a channel to the UEs 115 according to RF chain capabilities or supported bandwidths of the UEs 115 and/or other factors. In some examples, access network 200 is operated by multiple network operating entities (e.g., network operators), and the different network operating entities may share wireless spectrum (e.g., unlicensed spectrum).

Base station 105-*b*-1 may be operated by one or more network operating entities. For example, base station 105-*b*-1 may be operated by a first network operating entity to communicate with UE 115-*b*-1 via communication link 205, and base station 105-*b*-1 may be operated by a second network operating entity to communicate with UE 115-*b*-2 via communication link 210. In some aspects, base station 105-*b*-1 may coordinate communications between UE 115-*b*-1 and UE 115-*b*-2.

Base station 105-*b*-2 may also be operated by one or more network operating entities. In some examples, base station 105-*b*-2 is operated by a third network operating entity to communicate with UE 115-*b*-2 via communication link 215. In this example, UE 115-*b*-2 may be configured to operate with both the second and third network operating entities. The coordination at UE 115-*b*-2 of communications between base station 105-*b*-1 and base station 105-*b*-2 may be based on a partitioned and allocated time scale between the second and third network operators.

Access to the access network 200, the portioning and allocation of the resources, and/or the synchronization of the network operating entities may be controlled by a central coordinator (e.g., a spectrum access system (SAS)). In some examples, the partition and classification of resources may be autonomously determined based on the number of network operating entities. Synchronization between the network operating entities may occur explicitly through centralized signaling. Additionally or alternatively, the entities may employ a self-synchronization scheme based on "network-listening" where the wireless nodes (e.g., base stations 105) from different network operating entities listen to each other and determine a timing synchronization accordingly.

As indicated above, FIG. 2 is provided as an example. Other examples are possible and may differ from what was described above in connection with FIG. 2.

Figure 3:
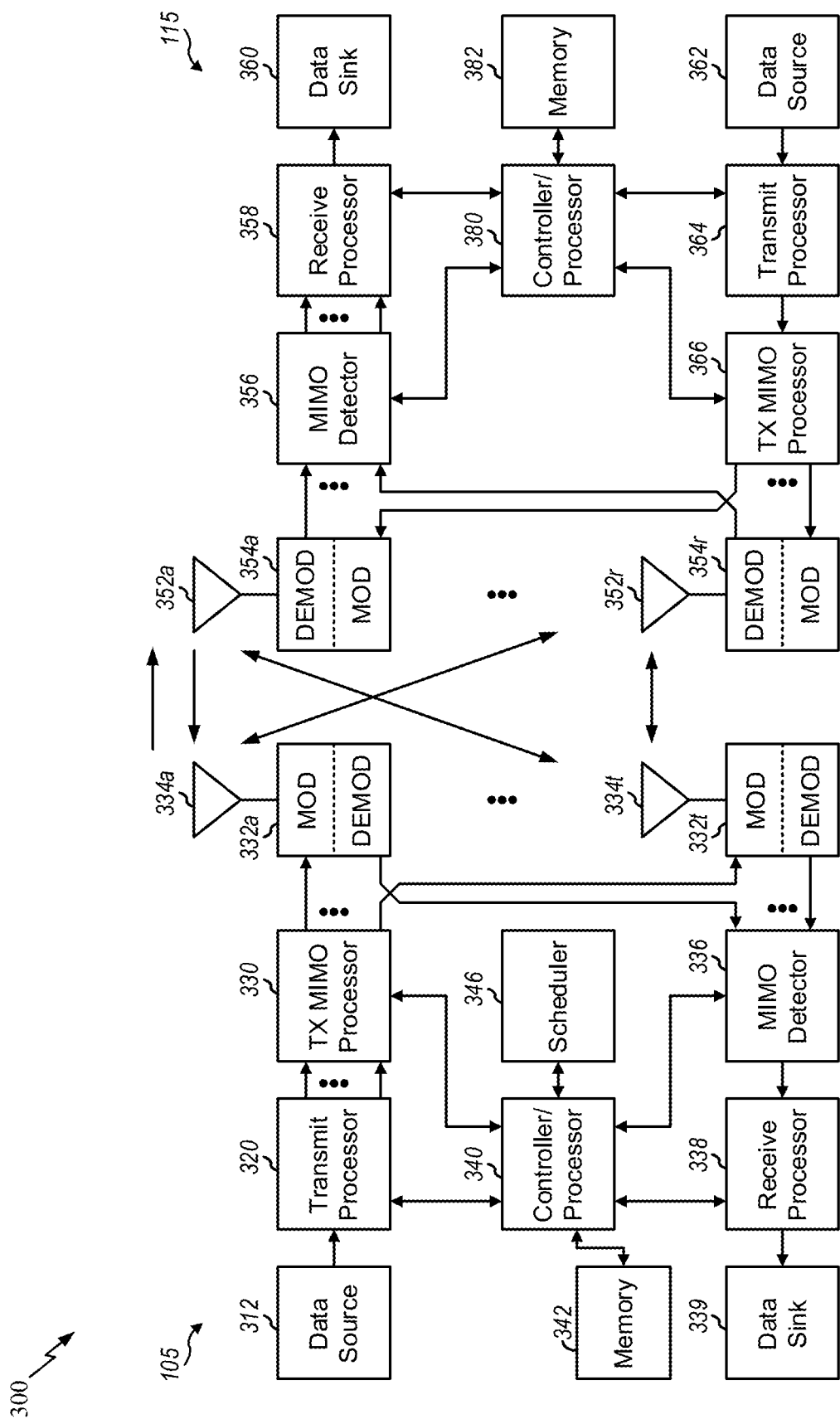
FIG. 3 shows a block diagram conceptually illustrating an example of a base station in communication with a user equipment (UE) in a wireless communications network, in accordance with certain aspects of the present disclosure.

FIG. 3 shows a block diagram of a design of base station 105 and UE 115, which may be one of the base stations and one of the UEs in FIG. 1. Base station 105 may be equipped with T antennas 334*a* through 334*t*, and UE 115 may be equipped with R antennas 352*a* through 352*r*, where in general T≥1 and R≥1.

At base station 105, a transmit processor 320 may receive data from a data source 312 for one or more UEs, select one or more modulation and coding schemes (MCS) for each UE based on CQIs received from the UE, process (e.g., encode and modulate) the data for each UE based on the MCS(s)

selected for the UE, and provide data symbols for all UEs. Transmit processor 320 may also process system information (e.g., for SRPI, etc.) and control information (e.g., CQI requests, grants, upper layer signaling, etc.) and provide overhead symbols and control symbols. Transmit processor 320 may also generate reference symbols for reference signals (e.g., the CRS) and synchronization signals (e.g., the PSS and SSS, and/or a synchronization signal associated with a 5G or NR system). A transmit (TX) multiple-input multiple-output (MIMO) processor 330 may perform spatial processing (e.g., precoding) on the data symbols, the control symbols, the overhead symbols, and/or the reference symbols, if applicable, and may provide T output symbol streams to T modulators (MODs) 332a through 332t. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. T downlink signals from modulators 332a through 332t may be transmitted via T antennas 334a through 334t, respectively. According to certain aspects described in more detail below, the synchronization signals may be simultaneously transmitted on multiple, different frequencies of a channel associated with base station 105 (e.g., using multiple, different antennas 334).

At UE 115, antennas 352a through 352r may receive the downlink signals from base station 105 and/or other base stations and may provide received signals to demodulators (DEMODs) 354a through 354r, respectively. Each demodulator 354 may condition (e.g., filter, amplify, downconvert, and digitize) its received signal to obtain input samples. Each demodulator 354 may further process the input samples (e.g., for OFDM, etc.) to obtain received symbols. A MIMO detector 356 may obtain received symbols from all R demodulators 354a through 354r, perform MIMO detection on the received symbols if applicable, and provide detected symbols. A receive processor 358 may process (e.g., demodulate and decode) the detected symbols, provide decoded data for UE 115 to a data sink 360, and provide decoded control information and system information to a controller/processor 380. A channel processor may determine RSRP, RSSI, RSRQ, CQI, etc.

On the uplink, at UE 115, a transmit processor 364 may receive and process data from a data source 362 and control information (e.g., for reports comprising RSRP, RSSI, RSRQ, CQI, etc.) from controller/processor 380. Processor 364 may also generate reference symbols for one or more reference signals. In some aspects, the one or more reference signals may include multiple reference signals to be simultaneously transmitted by UE 115. In some aspects, the data from the data source 362 may include information identifying RF chain capabilities or supported bandwidths of UE 115 and/or parameters relating to RF chain capabilities or supported bandwidths of the UE 115. The symbols from transmit processor 364 may be precoded by a TX MIMO processor 366 if applicable, further processed by modulators 354a through 354r (e.g., for SC-FDM, OFDM, etc.), and transmitted to base station 105. At base station 105, the uplink signals from UE 115 and other UEs may be received by antennas 334, processed by demodulators 332, detected by a MIMO detector 336 if applicable, and further processed by a receive processor 338 to obtain decoded data and control information sent by UE 115. Receive processor 338 may provide the decoded data to a data sink 339 and the decoded control information to controller/processor 340.

Controllers/processors 340 and 380 and/or any other component(s) in FIG. 3 may direct the operation at base station 105 and UE 115, respectively, to perform techniques presented herein for synchronization, scheduling, bandwidth allocation, and reference signal transmission. For example, processor 340 and/or other processors and modules at base station 105, may perform or direct operations of base station 105 to perform techniques presented herein for synchronization, scheduling, bandwidth allocation, and reference signal transmission. For example, controller/processor 340 and/or other controllers/processors and modules at UE 115 may perform or direct process 1300 shown in FIG. 13, process 1400 shown in FIG. 14, and/or process 1500 shown in FIG. 15. Memories 342 and 382 may store data and program codes for base station 105 and UE 115, respectively. A scheduler 346 may schedule UEs for data transmission on the downlink and/or uplink (e.g., based at least in part on RF chain capabilities or supported bandwidths and/or parameters relating to RF chain capabilities or supported bandwidths of the UEs).

The wireless communications system may support hybrid automatic retransmission request (HARQ) for data transmission on the downlink and uplink. For HARQ, a transmitter (e.g., a base station) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple base stations. One of these base stations may be selected to serve the UE. The serving base station may be selected based on various criteria, such as received signal strength, received signal quality, pathloss, etc. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering base stations.

While aspects of the examples described herein may be associated with LTE technologies, aspects of the present disclosure may be applicable with other wireless communications systems, such as NR or 5G technologies.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may utilize OFDM with a CP on the uplink and downlink and include support for half-duplex operation using TDD. NR may include Enhanced Mobile Broadband (eMBB) service targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra reliable low latency communications (URLLC) service.

A single component carrier bandwidth of 100 MHZ may be supported. NR resource blocks may span 12 sub-carriers with a sub-carrier bandwidth of 75 kHz over a 0.1 ms duration. The sub-carriers or component carriers may be scheduled or provisioned for UEs 115 based at least in part on RF chain capabilities or supported bandwidths of the UEs 115 and/or parameters relating to the RF chain capabilities. These RF chain capabilities or supported bandwidths and/or parameters may be signaled by the UEs 115 to the base station 105. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with multiple streams per UE may be supported. Aggregation of multiple cells may be supported with up to 8 serving cells. Alternatively, NR may support a different air interface, other than an OFDM-based interface. NR networks may include entities, such as central units or distributed units.

The RAN may include a central unit (CU) and distributed units (DUs). A NR base station (e.g., base station 105, gNB, 5G Node B, Node B, transmit receive point (TRP), access point (AP)) may correspond to one or multiple base stations. NR cells can be configured as access cells (ACells) or data only cells (DCells). For example, the RAN (e.g., a central unit or distributed unit) can configure the cells. DCells may be cells used for carrier aggregation, transmission or reception on multiple antennas (e.g., MIMO or advanced receivers), or dual connectivity, but not used for initial access, cell selection/reselection, or handover. In some cases, DCells may not transmit synchronization signals—in some cases, DCells may transmit SS. NR base stations may transmit downlink signals to UEs (e.g., UEs 115) indicating the cell type. Based on the cell type indication, the UE may communicate with a NR base station. For example, the UE may determine NR base stations to consider for cell selection, access, handover, and/or measurement based on the indicated cell type.

As indicated above, FIG. 3 is provided as an example. Other examples are possible and may differ from what was described above in connection with FIG. 3.

Figure 4:
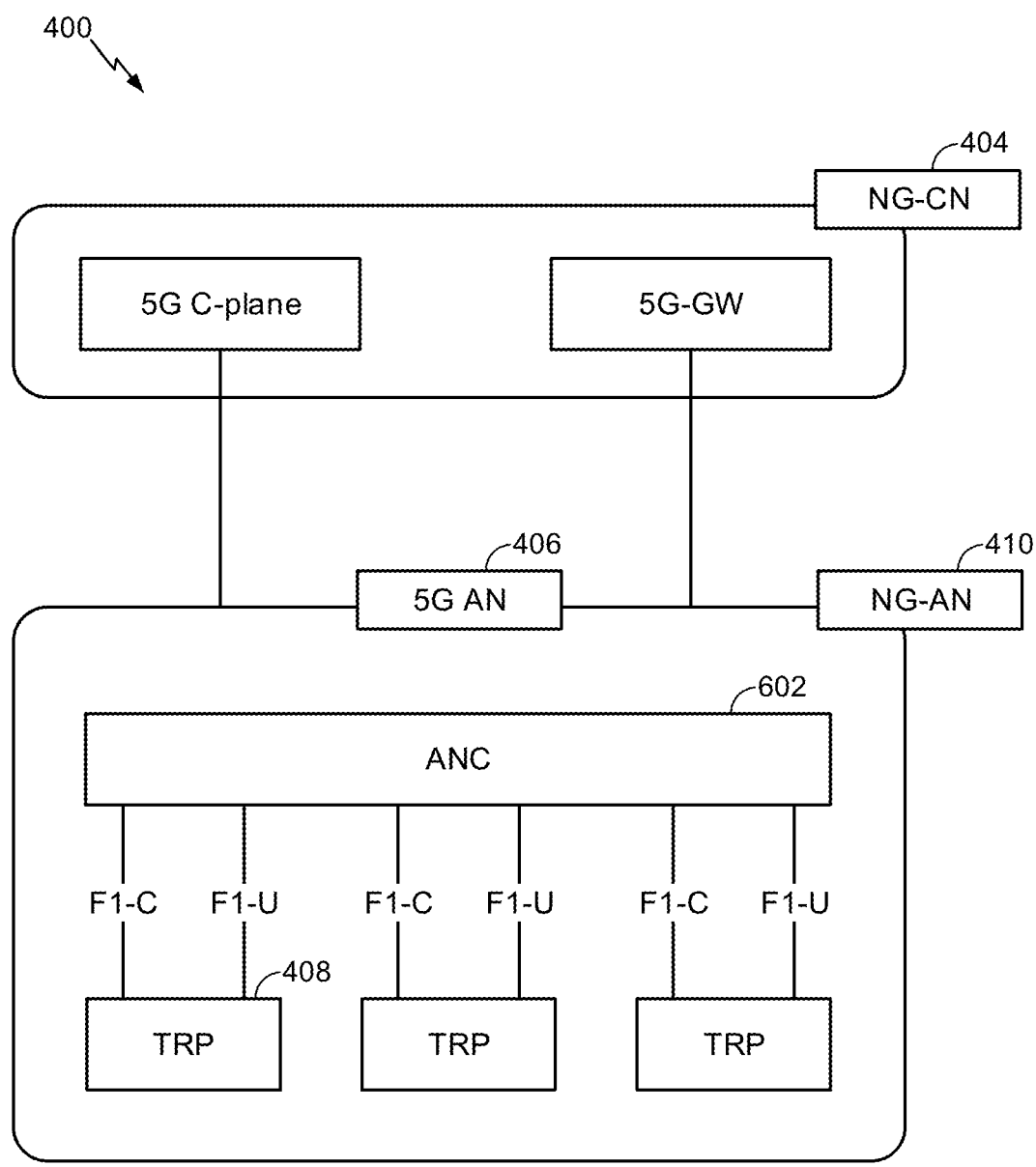
FIG. 4 illustrates an example logical architecture of a distributed radio access network (RAN), in accordance with certain aspects of the present disclosure.

FIG. 4 illustrates an example logical architecture of a distributed RAN 400, according to aspects of the present disclosure. A 5G access node 406 may include an access node controller (ANC) 402. The ANC 402 may be a central unit (CU) of the distributed RAN 400. The backhaul interface to the next generation core network (NG-CN) 404 may terminate at the ANC. The backhaul interface to neighboring next generation access nodes (NG-ANs) may terminate at the ANC 402. The ANC 402 may include one or more TRPs 408 (which may also be referred to as base stations, BSs, NR BSs, Node Bs, 5G NBs, APs, gNB, or some other term). As described above, a TRP may be used interchangeably with "cell."

The TRPs 408 may be a distributed unit (DU). The TRPs 408 may be connected to one ANC (ANC 502) or more than one ANC (not illustrated). For example, for RAN sharing, radio as a service (RaaS), and service specific AND deployments, the TRP 408 may be connected to more than one ANC. A TRP 408 may include one or more antenna ports. The TRPs 408 may be configured to individually (e.g., dynamic selection) or jointly (e.g., joint transmission) serve traffic to a UE based at least in part on RF chain capabilities or supported bandwidths of the UE. In some aspects, the TRPs 408 may be configured to indicate that the UE is to simultaneously transmit reference signals on multiple, different frequencies using multiple antennas of the UE, which may permit the TRPs 408 to determine channel conditions on the multiple, different frequencies.

The local architecture 400 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 410 may support dual connectivity with NR. The NG-AN may share a common fronthaul for LTE and NR.

The architecture may enable cooperation between and among TRPs 408. For example, cooperation may be preset within a TRP 408 and/or across TRPs 408 via the ANC 402. According to aspects, no inter-TRP interface may be needed/present.

According to aspects, a dynamic configuration of split logical functions may be present within the architecture 400. The PDCP, RLC, MAC protocol may be adaptably placed at the ANC 402 or TRP 408.

According to certain aspects, a base station may include a central unit (CU) (e.g., ANC 702) and/or one or more distributed units (e.g., one or more TRPs 408).

As indicated above, FIG. 4 is provided as an example. Other examples are possible and may differ from what was described above in connection with FIG. 4.

Figure 5:
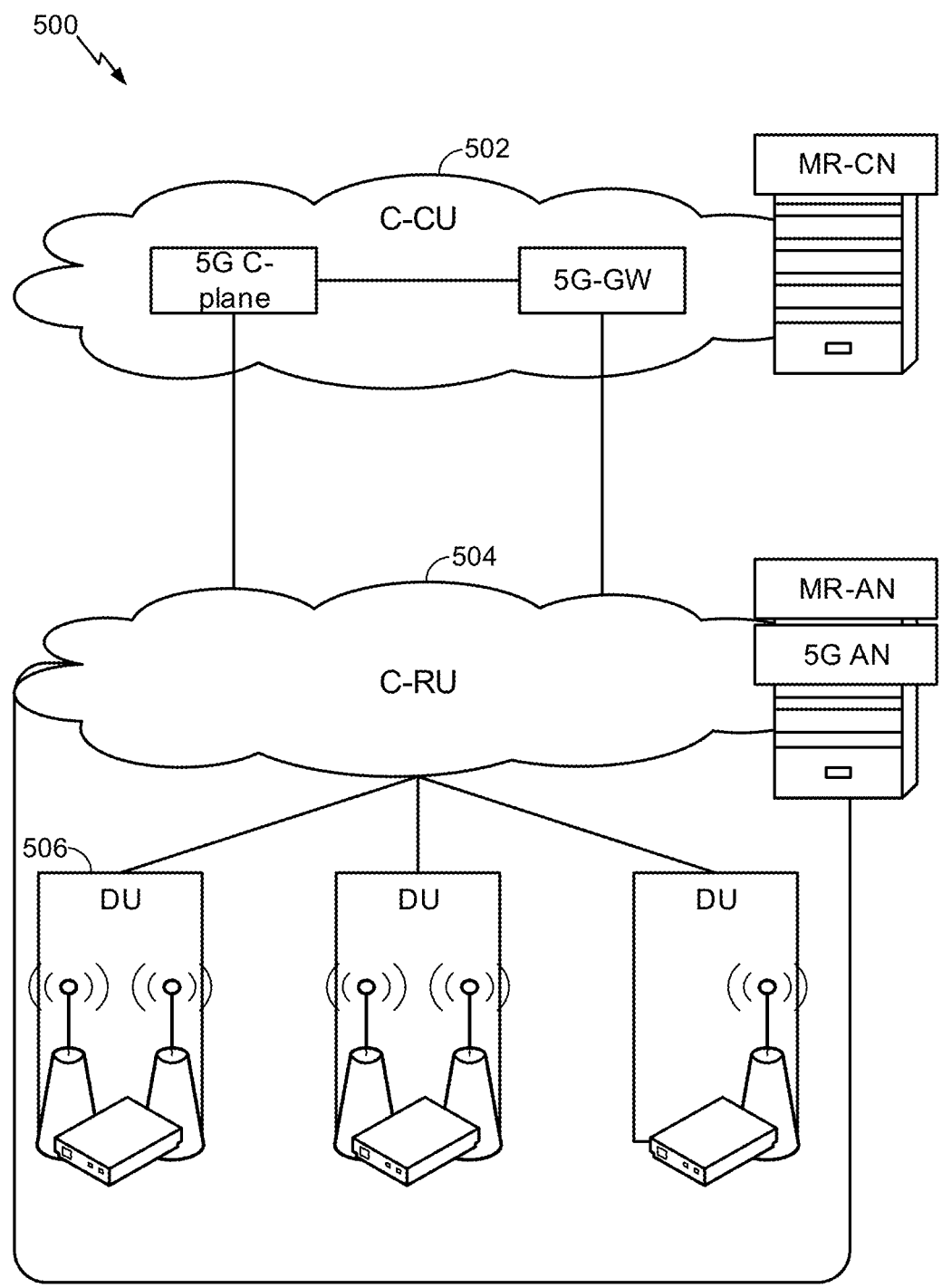
FIG. 5 illustrates an example physical architecture of a distributed radio access network (RAN), in accordance with certain aspects of the present disclosure.

FIG. 5 illustrates an example physical architecture of a distributed RAN 500, according to aspects of the present disclosure. A centralized core network unit (C-CU) 502 may host core network functions. The C-CU 502 may be centrally deployed. C-CU functionality may be offloaded (e.g., to advanced wireless services (AWS)), in an effort to handle peak capacity.

A centralized RAN unit (C-RU) 504 may host one or more ANC functions. Optionally, the C-RU 504 may host core network functions locally. The C-RU 504 may have distributed deployment. The C-RU 504 may be closer to the network edge.

A distributed unit (DU) 506 may host one or more TRPs. The DU 506 may be located at edges of the network with radio frequency (RF) functionality.

As indicated above, FIG. 5 is provided as an example. Other examples are possible and may differ from what was described above in connection with FIG. 5.

Figure 6:
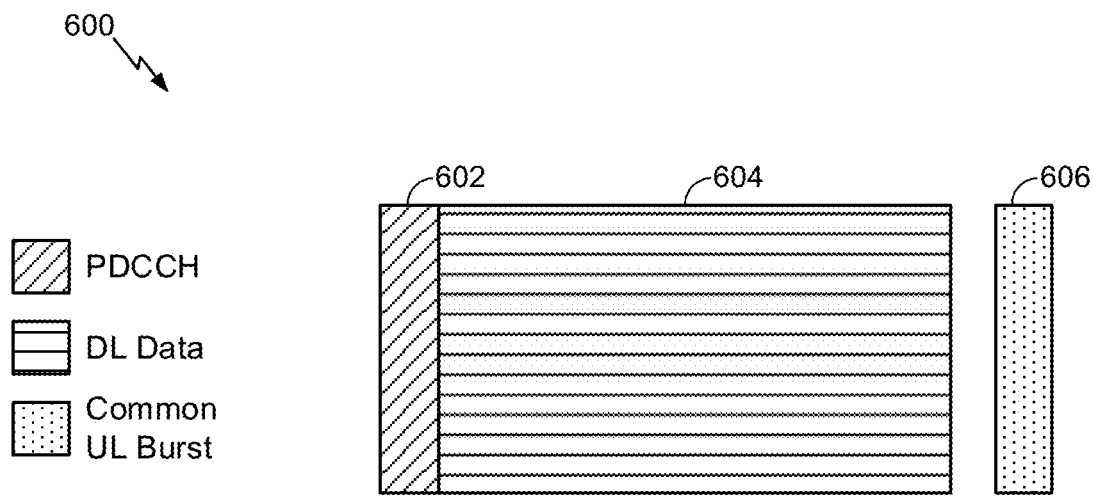
FIG. 6 is a diagram illustrating an example of a downlink (DL)-centric subframe, in accordance with certain aspects of the present disclosure.

FIG. 6 is a diagram 600 showing an example of a DL-centric subframe. The DL-centric subframe may include a control portion 602. The control portion 602 may exist in the initial or beginning portion of the DL-centric subframe. The control portion 602 may include various scheduling information and/or control information corresponding to various portions of the DL-centric subframe, and/or may identify one or more reference signals to be simultaneously transmitted by the UE. In some configurations, the control portion 602 may be a physical DL control channel (PDCCH), as indicated in FIG. 6. In some configurations, the control portion 602 may identify a bandwidth allocation of one or more sub-bands or sub-channels of a channel.

The DL-centric subframe may also include a DL data portion 604. The DL data portion 604 may sometimes be referred to as the payload of the DL-centric subframe. The DL data portion 604 may include the communication resources utilized to communicate DL data from the scheduling entity (e.g., UE or base station) to the subordinate entity (e.g., UE). In some configurations, the DL data portion 604 may be a physical DL shared channel (PDSCH).

The DL-centric subframe may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the DL data portion 604 and/or the control portion 606. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), RF chain capabilities of the UE, parameters relating to RF chain capabilities of the UE, and various other suitable types of information.

As illustrated in FIG. 6, the end of the DL data portion 606 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). The foregoing is merely one example of a DL-centric subframe and alternative structures having similar features may exist without necessarily deviating from the aspects described herein.

As indicated above, FIG. 6 is provided as an example. Other examples are possible and may differ from what was described above in connection with FIG. 6.

Figure 7:
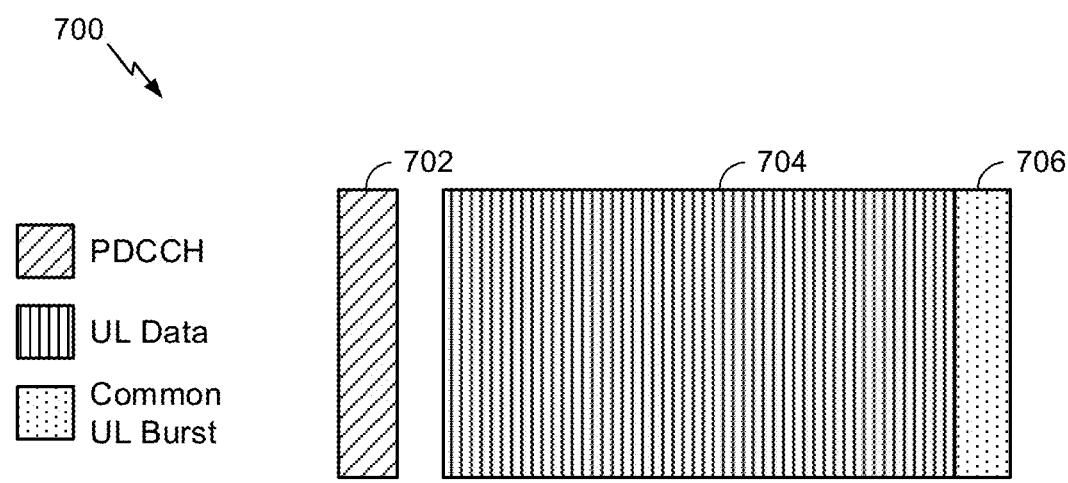
FIG. 7 is a diagram illustrating an example of an uplink (UL)-centric subframe, in accordance with certain aspects of the present disclosure.

FIG. 7 is a diagram 700 showing an example of an UL-centric subframe. The UL-centric subframe may include a control portion 702. The control portion 702 may exist in the initial or beginning portion of the UL-centric subframe. The control portion 702 in FIG. 7 may be similar to the control portion 602 described above with reference to FIG. 6. In some aspects, the control portion 602 may be a physical DL control channel (PDCCH).

The UL-centric subframe may also include an UL data portion 704. The UL data portion 704 may sometimes be referred to as the payload of the UL-centric subframe. The UL data portion 704 may refer to the communication resources utilized to communicate UL data from the subordinate entity (e.g., UE) to the scheduling entity (e.g., UE or base station).

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity).

The UL-centric subframe may also include a common UL portion 706. The common UL portion 706 in FIG. 7 may be similar to the common UL portion 606 described above with reference to FIG. 6. The common UL portion 706 may additionally or alternatively include information pertaining to channel quality indicator (CQI), sounding reference signals (SRSs), RF chain capabilities, supported bandwidths, and various other suitable types of information. The foregoing is merely one example of an UL-centric subframe and alternative structures having similar features may exist without necessarily deviating from the aspects described herein.

In one example, a frame may include both UL centric subframes and DL centric subframes. In this example, the ratio of UL centric subframes to DL subframes in a frame may be dynamically adjusted based on the amount of UL data and the amount of DL data that are transmitted. For example, if there is more UL data, then the ratio of UL centric subframes to DL subframes may be increased. Conversely, if there is more DL data, then the ratio of UL centric subframes to DL subframes may be decreased. Additionally, or alternatively, bandwidth allocation of the UE may be increased or decreased based on the ratio and/or quantity of UL centric subframes to DL centric subframes.

As indicated above, FIG. 7 is provided as an example. Other examples are possible and may differ from what was described above in connection with FIG. 7.

Figure 8A:
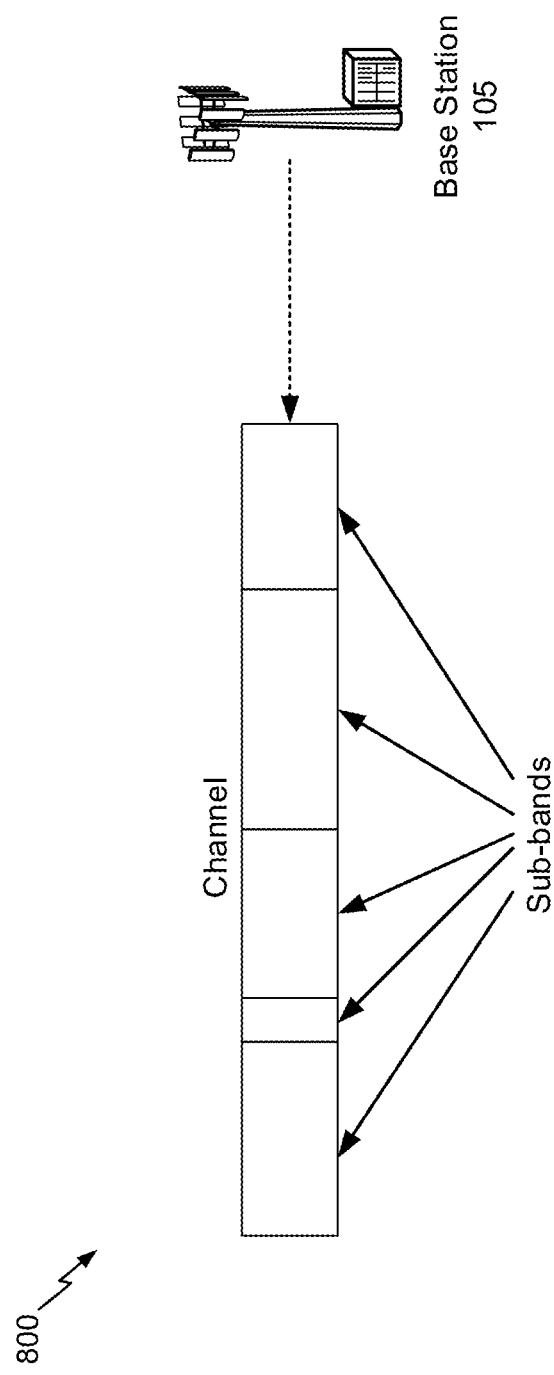
FIGS. 8A and 8B illustrate examples of bandwidth resource allocation for UEs in a wireless communications system, such as a NR or 5G system, in accordance with certain aspects of the present disclosure.
Figure 8B:
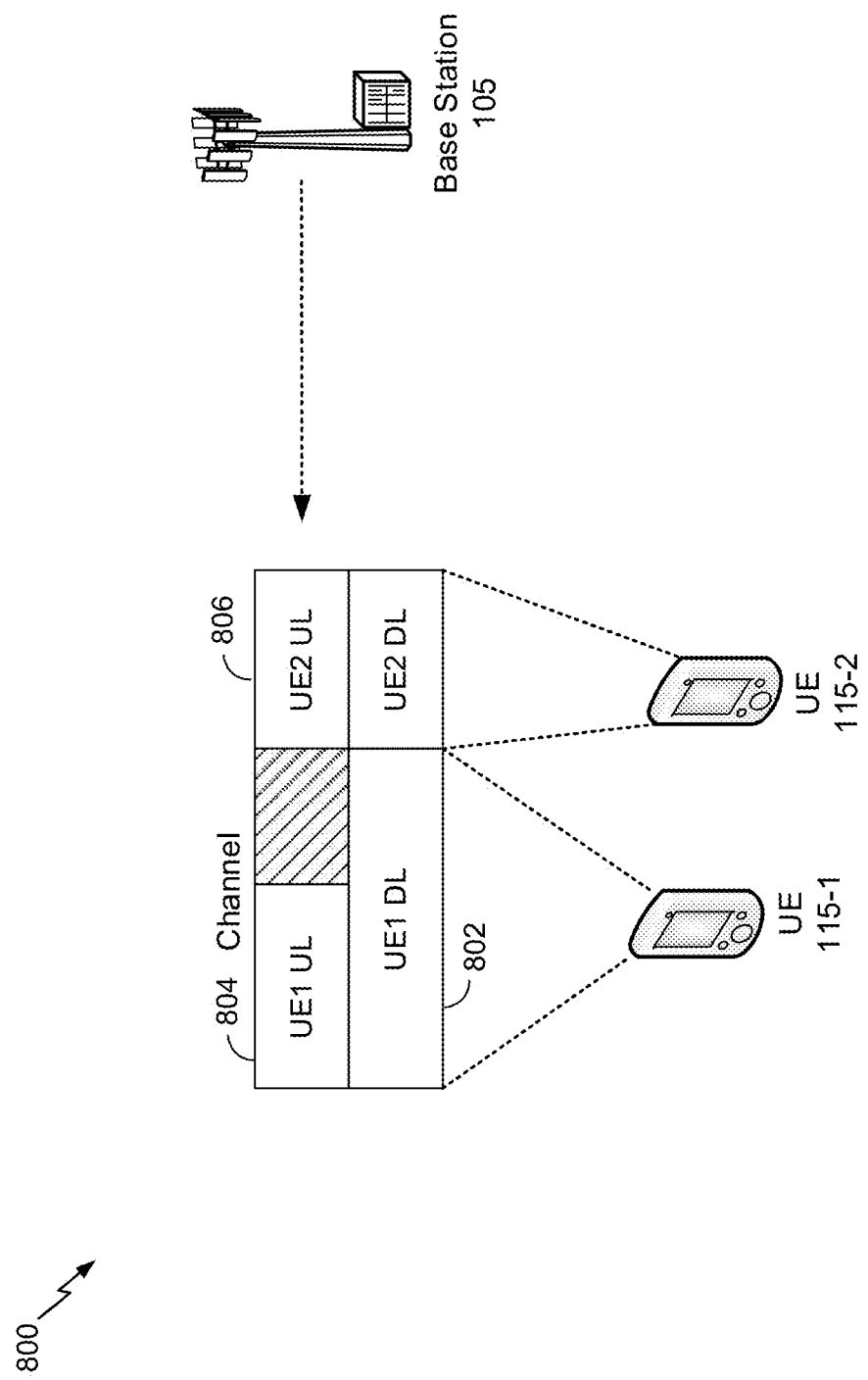

FIGS. 8A and 8B illustrate examples 800 of bandwidth resource allocation for UEs in a wireless communication network, in accordance with aspects of the present disclosure.

As shown in FIG. 8A, a base station (e.g., base station 105) may identify a channel to be provided to one or more UEs (e.g., UEs 115). In some aspects, the channel may include a channel of a 5G or NR system. In such aspects, the channel may include licensed spectrum (e.g., the LTE spectrum and/or another licensed part of the radio frequency spectrum), unlicensed spectrum (e.g., WiFi spectrum, unlicensed LTE spectrum, millimeter band spectrum, short wave spectrum, and/or another part of the radio frequency spectrum), or a combination of licensed spectrum and unlicensed spectrum.

As further shown, the channel may be divided into two or more sub-bands. For example, the two or more sub-bands may be equal in bandwidth, or may be unequal in bandwidth (as shown). The base station may provision sub-bands (e.g., bandwidth) of the channel based at least in part on various factors or parameters, such as uplink or downlink traffic to be provided within the channel, priority of the uplink or downlink traffic, channel quality of the channel, capabilities of the base station and/or UEs connected with the base station, categories of the UEs connected with the base station, or the like. As one possible example, a sub-band may have a minimum size of approximately 100 MHz. Other examples of sub-band size are possible, and may be implemented in practice. For example, the base station may increase or decrease a bandwidth of a sub-band, may combine multiple sub-bands to form a single sub-band, or the like.

As shown in FIG. 8B, sub-bands (e.g., also referred to herein as sub-channels or portions) of the channel may be provisioned or allocated for UEs 115. As shown by reference number 802, a first portion of the channel is allocated for downlink traffic to UE 115-1. As shown by reference number 804, part of the portion of the channel allocated for downlink traffic to UE 115-1 is also allocated for uplink traffic from UE 115-1. In some aspects, the UE 115-1 may support any channel bandwidth (e.g., any channel bandwidth down to a particular granularity that may be defined by a specification).

In some aspects, as shown by reference number 806, the portions of the channel allocated for downlink traffic and uplink traffic of UE 115 may be equal, as for UE 115-2. In some aspects, a portion of the channel allocated for downlink traffic to a particular UE 115 may not overlap a portion of the channel allocated for uplink traffic from the particular UE 115. In some aspects, different UEs 115 may support different bandwidths or maximum RF chain capabilities (e.g., 100 MHz, 400 MHz, etc.). These different UEs 115 may nevertheless be provisioned within the same channel, thus improving versatility of the NR or 5G system and efficiency of spectrum usage. In some aspects, all control and data operations of a UE 115 may be confined within the bandwidth allotted to the UE 115.

In some aspects, UE 115 may include two or more radio frequency (RF) chains for transmitting or receiving communications within the channel. In such aspects, the base station 105 may allocate respective portions of the bandwidth of the channel for each of the two or more RF chains. For example, each RF chain may be allotted a respective portion of the bandwidth of the channel. In some aspects, the portions of the channel allotted for each RF chain may be equal in bandwidth. In some aspects, the portions of the channel allotted for each RF chain may have different bandwidths (e.g., based on traffic conditions, channel conditions, channel availability, etc.). In some aspects, the bandwidth allotted to the UEs 115 and/or RF chains of the UEs 115 may be reconfigured (e.g., dynamically) based at least in part on needs of the UEs 115, channel conditions, or the like, to enable power savings and more efficient spectrum use. In this way, the base station may more efficiently allocate network resources and may dynamically adapt to bandwidth needs of the base station and/or the UEs.

As indicated above, FIGS. 8A and 8B are provided as examples. Other examples are possible and may differ from what was described above in connection with FIGS. 10A and 10B.

Figure 9A:
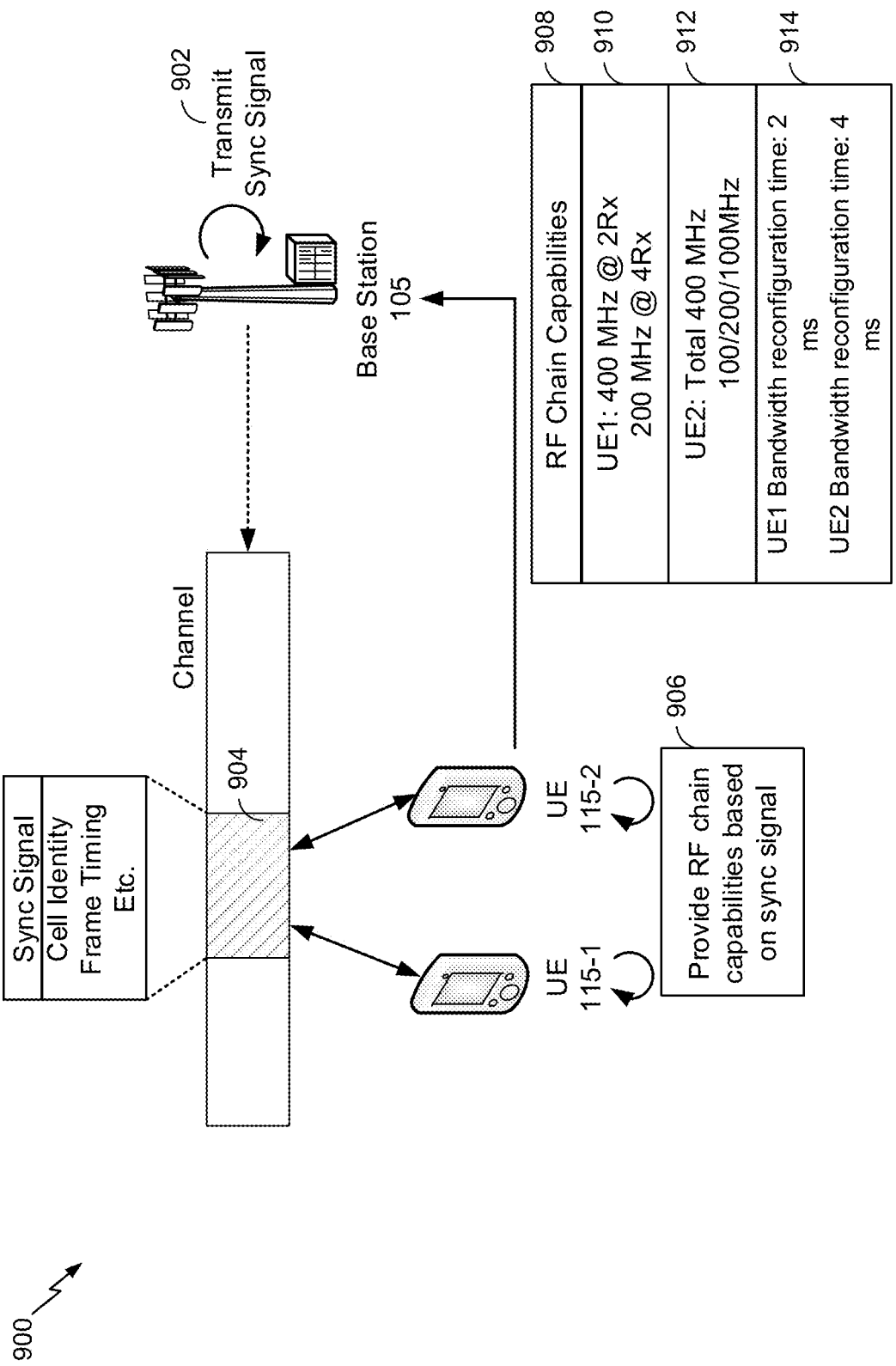
FIGS. 9A-9C illustrate examples of synchronization signaling, communication scheduling, and reconfiguration of allocated bandwidth resources in a wireless communications system, in accordance with certain aspects of the present disclosure.
Figure 9B:
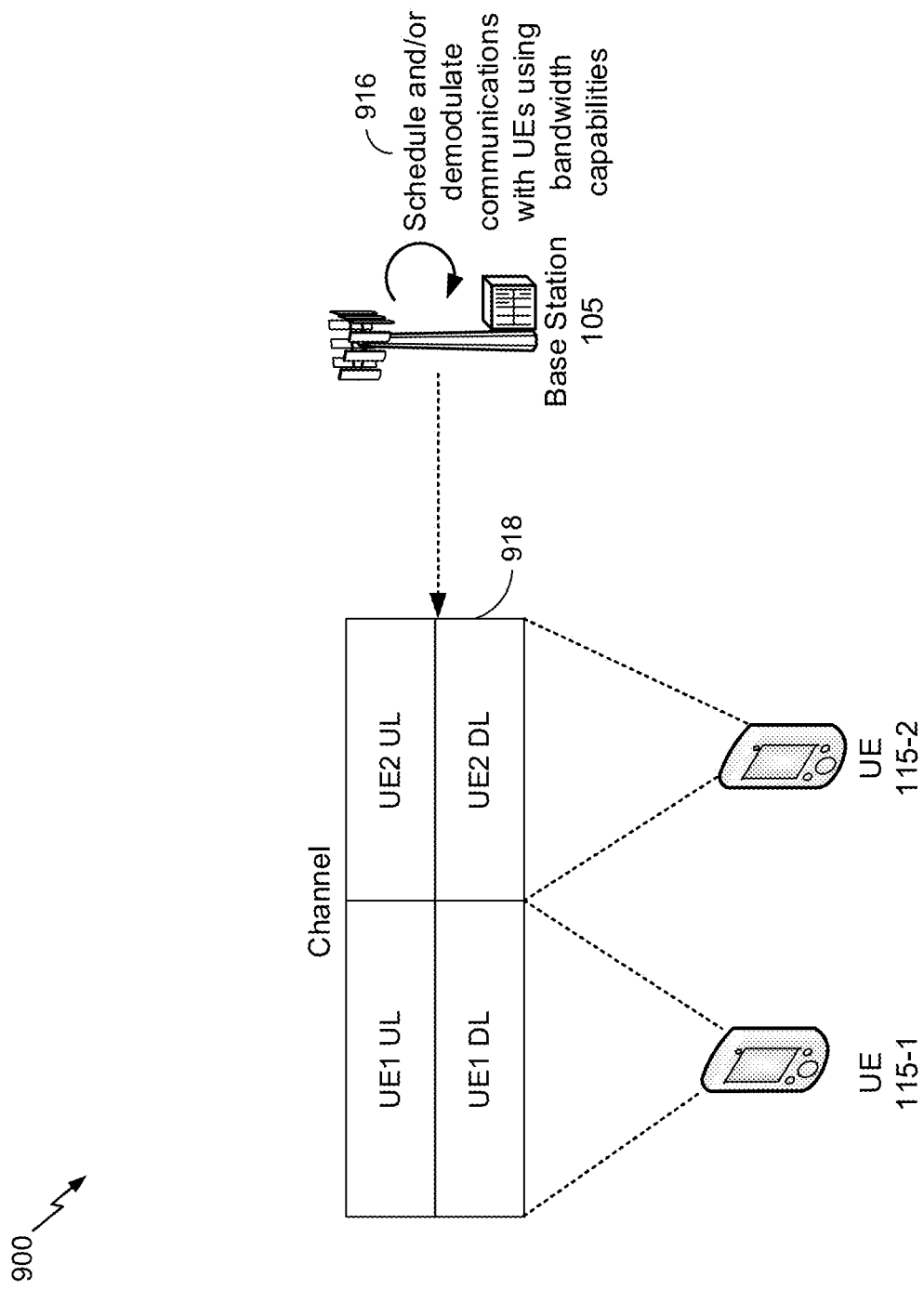
Figure 9C:
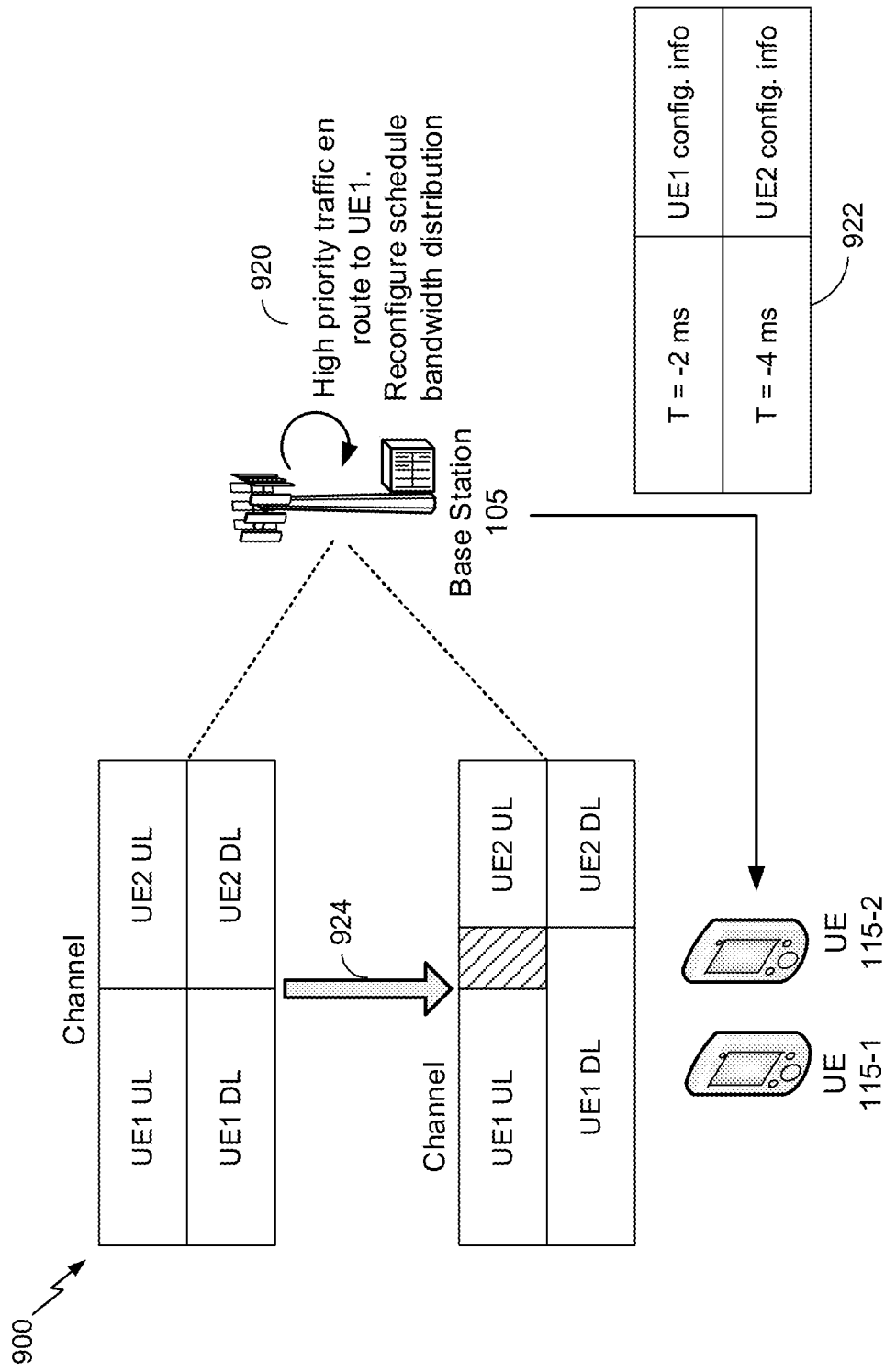

FIGS. 9A-9C illustrate examples 900 of synchronization signaling, communication scheduling, and reconfiguration of allocated bandwidth resources in a wireless communication network, in accordance with aspects of the present disclosure.

As shown in FIG. 9A, and by reference number 902, a base station 105 may transmit a synchronization signal (shown in FIG. 9A as "sync signal"). As shown, the synchronization signal may include information to be used by UE 115 to synchronize (e.g., connect, camp, etc.) with base station 105 (e.g., cell identity information, frame timing information, etc.). In some aspects, the synchronization signal may include information similar to the information included in a PSS or an SSS, as described in more detail in connection with FIG. 1. In some aspects, the synchronization signal may be implemented at a particular subframe and/or slot of a frame transmitted by the base station 105. For example, the particular subframe and/or slot may be a same subframe and/or slot that carries an LTE synchronization signal. Additionally, or alternatively, the synchronization signal may be transmitted in a different subframe or slot than an LTE synchronization signal.

As shown by reference number 904, the synchronization signal may be transmitted at a single frequency and/or within a single sub-band (e.g., one synchronization signal per channel, at the center of the channel or elsewhere within the channel). For example, a specification may define the single frequency and/or the single sub-band, and UEs 115 may be configured to receive the synchronization signal at the single frequency and/or the single sub-band. In some aspects, the single frequency and/or the single sub-band may not include a frequency center of the channel, which enables UEs 115 that do not support the frequency center of the channel to receive the synchronization signal, thereby improving bandwidth versatility of the base station 105 and/or the UEs 115. Further, using the single frequency and/or the sub-band may conserve resources of the base station 105, as compared to transmitting synchronization signals on multiple, different frequencies or sub-bands. In some aspects, the base station 105 may transmit synchronization signals on multiple, different frequencies or sub-bands of a channel, which permits UEs 115 that are configured to receive synchronization signals on different sub-bands (e.g., UEs 115 with smaller RF chain capabilities) to synchronize with the base station 105. As shown, the UEs 115-1 and 115-2 may receive the synchronization signal.

As shown by reference number 906, the UEs 115 may provide information identifying RF chain capabilities of the UEs 115 to the base station 105 based at least in part on receiving the synchronization signal. An RF chain capability may identify a bandwidth on which a UE 115 is capable of transmitting and/or receiving network traffic or configured to transmit and/or receive network traffic. The base station 105 may schedule communications with the UE 115 based at least on part on the RF chain capability of the UE 115, as described in more detail in connection with FIG. 11B, below.

In some aspects, as shown by reference number 908, the UEs 115 may be associated with different RF chain capabilities. As shown by reference number 910, in some aspects, a UE 115 may report an RF chain capability with regard to one or more parameters, such as RF configuration information of the UE 115 (e.g., an advanced receiver parameter). Here, the UE 115-1 may be associated with an RF chain capability of 400 MHz when using 2-antenna reception (e.g., 2Rx), and an RF chain capability of 200 MHz when using 4-antenna reception (e.g., 4Rx). For example, UE 115-1 may require more processor resources to perform 4Rx than 2Rx, so the RF chain capability of the UE 115-1 when performing 4Rx may be less than the RF chain capability of the UE 115-1 when performing 2Rx.

In some aspects, the information identifying the RF chain capabilities and/or parameters associated with the RF chain capabilities may be provided via a particular bandwidth. For example, the particular bandwidth may include a bandwidth within which control signaling is performed, irrespective of a bandwidth configuration of the UE 115 at a given time. In some aspects, the particular bandwidth may be defined based at least in part on a specification. Additionally, or alternatively, the particular bandwidth may be configured by the network (e.g., a scheduling entity) according to capabilities of the UE 115.

As shown by reference number 912, a UE 115 may report a total RF chain capability, a contiguous RF chain capability, and/or information identifying an RF chain capability distribution of the UE 115. Here, the UE 115-2 may be associated with a total RF chain capability of 400 MHz and an RF chain capability distribution of 100/200/100 MHz. The RF chain capability distribution may indicate that the UE 115-2 is capable of receiving or transmitting data via three bandwidth allotments of 100 MHz, 200 MHz, and 100 MHz, respectively.

As shown by reference number 914, the UEs 115 may provide information identifying a bandwidth reconfiguration time. For example, the base station 105 may reconfigure provisioning of one or more sub-bands of the channel based at least in part on uplink or downlink traffic and/or other factors. In such a case, a UE 115 may take a particular amount of time to reconfigure from a first bandwidth provisioned by the base station 105 to a second bandwidth provisioned by the base station 105. The bandwidth reconfiguration time may identify the particular length of time. Here, the UE 115-1 signals that UE 115-1 can reconfigure in 2 ms, and the UE 115-2 signals that the UE 115-2 can reconfigure in 4 ms. In some aspects, the UEs 115 may provide information identifying the RF chain capabilities and/or the parameters associated with the RF chain capabilities via a physical control channel (e.g., PUCCH, PUSCH, or uplink control channel). Additionally, or alternatively, the UEs 115 may provide the information identifying the RF chain capabilities and/or the parameters associated with the RF chain capabilities via a higher-level channel, such as a channel associated with the radio resource control (RRC) layer.

As shown in FIG. 9B, and by reference number 916, the base station 105 may schedule and/or demodulate communications with the UEs 115-1 and 115-2 based at least in part on the RF chain capabilities of the UEs 115-1 and 115-2. As shown by reference number 918, the base station 105 may schedule communications on portions of the channel for uplink and/or downlink communication with the UEs 115-1 and 115-2. Here, the base station 105 schedules communications on approximately equal portions of the channel for UEs 115-1 and 115-2. In some aspects, the base station 105 may schedule communications on unequal sub-bands or portions of the channel UEs 115. For example, the base station 105 may schedule communications on sub-bands of the channel based at least in part on the RF chain capability distribution of UE 115-2. Additionally, or alternatively, the base station 105 may determine whether UE 115-1 is to receive downlink traffic using a 2Rx configuration or a 4Rx configuration, and may schedule communications with the UE 115-1 appropriately (e.g., may schedule communications on a 400 MHz band when the UE 115-1 is to use a 2Rx configuration, and may schedule communications on a 200 MHz band when the UE 115-1 is to use a 4Rx configuration).

As shown in FIG. 9C, and by reference number 920, the base station 105 may determine that high priority traffic is scheduled for transmission to UE 115-1. Accordingly, the base station 105 may reconfigure the scheduled bandwidth distribution associated with the UEs 115-1 and 115-2.

As shown by reference number 922, the base station 105 may provide configuration information to the UEs 115 to enable reconfiguration of operating bandwidths of the UEs 115 according to the scheduled bandwidth distribution. The configuration information may identify updated scheduling information indicating that the UEs 115 are to be reconfigured from first bandwidths, scheduled as shown in FIG. 9C, to new bandwidths that are determined based at least in part on the high-priority traffic scheduled for transmission to UE 115-1. In some aspects, the base station 105 may provide the configuration via a physical control channel (e.g., a downlink control channel, such as PDCCH). Additionally, or alternatively, the base station 105 may provide the configuration information via a higher-level channel, such as a channel associated with the radio resource control (RRC) layer.

As further shown, the base station 105 provides the configuration information to UE 115-1 at a time T=−2 ms, which matches the bandwidth reconfiguration time provided by the UE 115-1 in connection with FIG. 9A, above. As shown, the base station 105 provides the configuration information to the UE 115-2 at a time T=−4 ms, which matches the bandwidth reconfiguration time provided by the UE 115-2 in connection with FIG. 9A, above. In this way, the base station 105 permits the UEs 115-1 and 115-2 to be reconfigured to the new bandwidths or updated scheduling information simultaneously, thus improving performance of the base station 105 and the UEs 115-1 and 115-2.

In some aspects, the base station 105 may provide the configuration information to the UEs 115 simultaneously, and may provide information indicating a time at which the UEs 115 are to be reconfigured, which may cause simultaneous reconfiguration of the UEs 115. Additionally, or alternatively, the base station 105 may perform implicit signaling through resource allocation. For example, the base station 105 may determine that the UEs 115 are capable of reconfiguring within a threshold length of time (e.g., a length time shorter than a time gap between reception, by the UEs 115, of uplink control information and/or downlink control information and transmission or reception of data on the new bandwidths). In such a case, the base station 105 may reallocate the bandwidths to the new bandwidths without transmitting the configuration information to the UEs 115. The UEs 115 may reconfigure to the new bandwidths based at least in part on receiving uplink control information or downlink control information identifying the new bandwidths, and may transmit or receive the data on the new bandwidths. In this way, the base station 105 reconfigures the bandwidths associated with the UEs 115 "on the fly," which reduces time and network overhead associated with reconfiguring the UEs 115.

As shown by reference number 924, the base station 105 increases an uplink/downlink bandwidth of the UE 115-1, and decreases an uplink/downlink bandwidth of the UE 115-2. Assume that the UEs 115-1 and 115-2 perform reconfiguration operations to receive or transmit traffic within the reconfigured uplink/downlink bandwidths. In this way, the base station 105 dynamically reconfigures the channel to provide traffic to UEs 115-1 and 115-2, which improves utilization of network resources and improves performance of UEs 115-1 and 115-2.

As indicated above, FIGS. 9A-9C are provided as examples. Other examples are possible and may differ from what was described above in connection with FIGS. 9A-9C.

Figure 10:
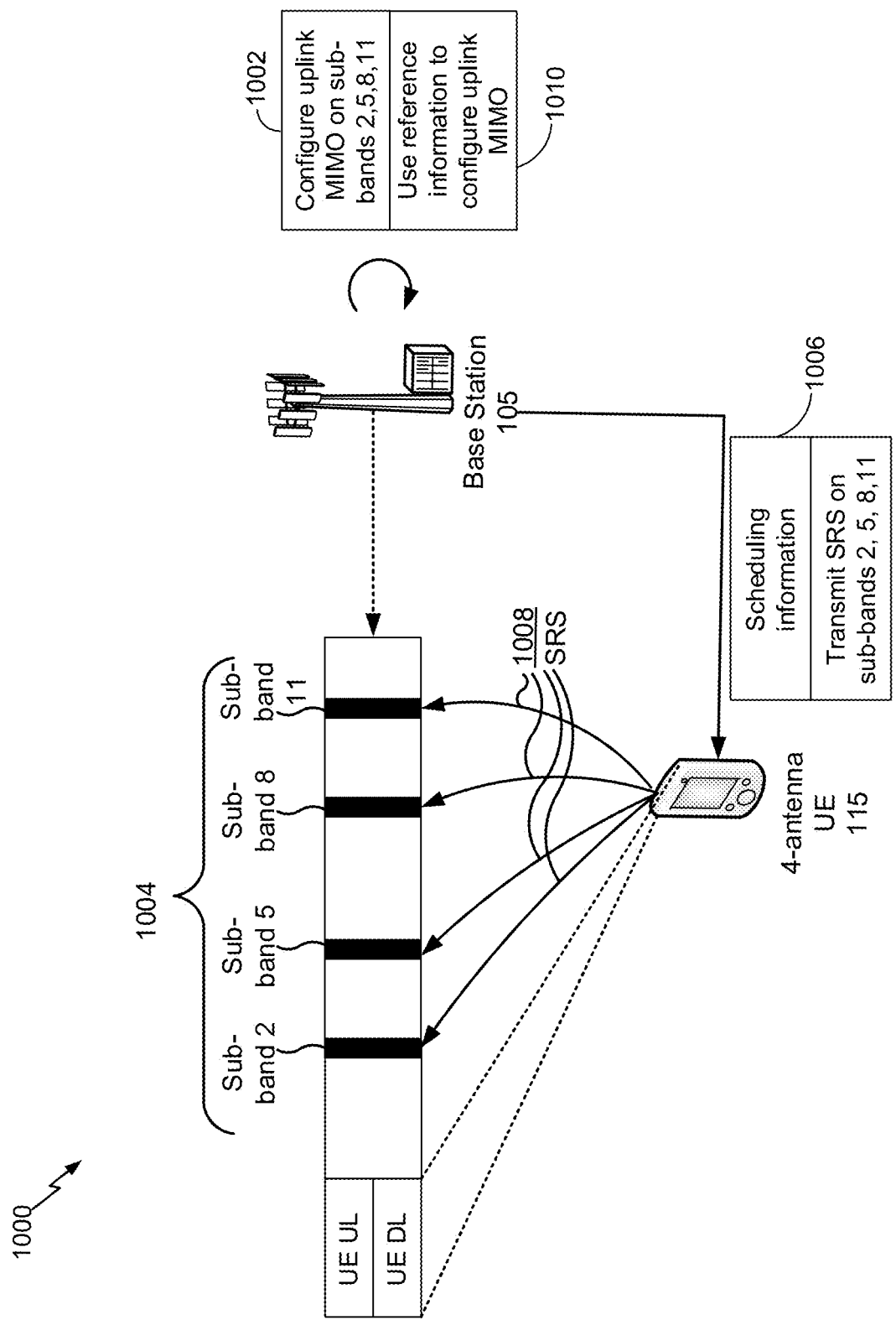
FIG. 10 illustrates an example of reference signaling in a wireless communications system, in accordance with certain aspects of the present disclosure.

FIG. 10 illustrates an example 1000 of synchronization signaling, communication scheduling, and reconfiguration of allocated bandwidth resources in a wireless communication network, in accordance with aspects of the present disclosure.

As shown in FIG. 10, and by reference number 1002, a base station 105 may configure uplink MIMO with regard to particular sub-bands of a channel (e.g., sub-bands 2, 5, 8, and 11). To configure the uplink MIMO, the base station 105 may determine channel quality values for the particular sub-bands based on causing a UE 115 to transmit sounding reference signals (SRSs) on the particular sub-bands. For example, 5G and/or NR systems (e.g., 5G and/or NR systems associated with higher frequencies) may be implemented using TDD and/or channel reciprocity, and may rely on SRSs transmitted by the UE 115 to perform channel measurements outside the sub-channel on which traffic associated with the UE 115 is scheduled.

As shown by reference number 1004, the particular sub-bands of the channel do not overlap bandwidth of a data uplink or downlink that is allocated to the UE 115. As further shown, the UE 115 is a 4-antenna UE 115, indicating that the UE 115 is capable of simultaneously transmitting SRSs on four frequencies.

As shown by reference number 1006, the base station 105 may provide, to the UE 115, scheduling information indicating that the UE 115 is to transmit the SRSs within the particular sub-bands. As shown by reference number 1008, the UE 115 transmits the SRSs within the particular sub-bands. Notably, the particular sub-bands are not associated with bandwidth of a data uplink or downlink of the UE 115, which permits the base station 105 to determine the channel quality conditions for bands of the channel that are not allocated to UEs 115. Assume that the base station 105 receives the SRSs on the particular sub-bands.

As shown by reference number 1010, the base station 105 may use reference information, determined using the SRSs (e.g., channel quality information, channel noise information, etc.) to configure an uplink MIMO operation of the base station 105. In this way, the base station 105 causes the UE 115 to provide SRSs for portions of the channel that are not allocated to the UE 115, which improves versatility and efficiency of testing channel quality, for example, in higher-frequency 5G and/or NR systems that use TDD and/or channel reciprocity.

As indicated above, FIG. 10 is provided as an example. Other examples are possible and may differ from what was described above in connection with FIG. 10.

Figure 11:
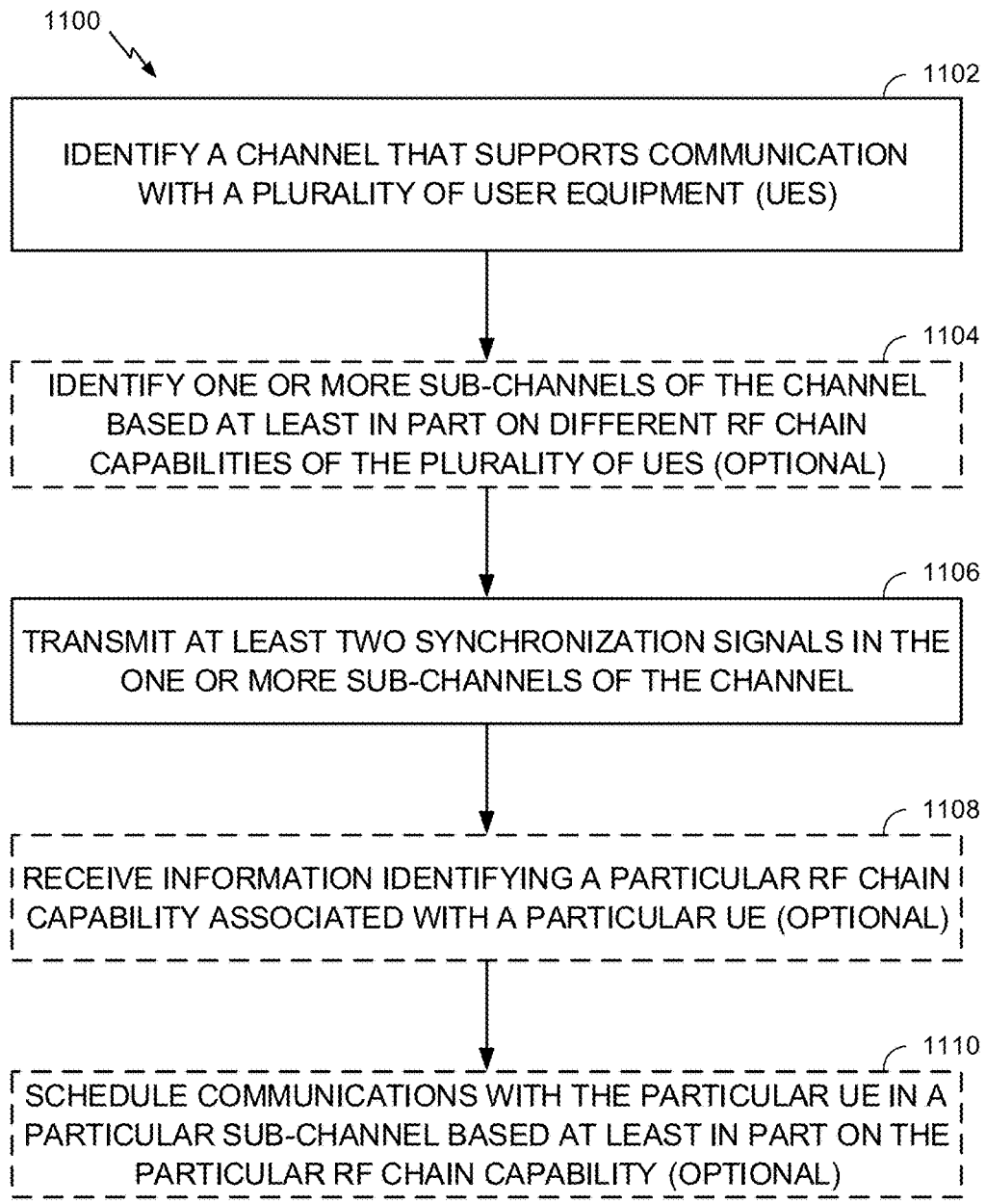
FIG. 11 is a flow chart of a method for wireless communication, in accordance with certain aspects of the present disclosure.

FIG. 11 is a flow chart of a method 1100 for wireless communication. The method 1100 may be performed by a base station (e.g., the base station 105 of FIG. 1) or a UE (e.g., the UE 115 of FIG. 1).

At 1102, the base station may identify a channel that supports communications with a plurality of UEs. In some aspects, the channel may include a channel of a 5G or NR system. In some aspects, the channel may include sub-bands of bandwidth to be used to receive and/or transmit data of the UEs. For example, the base station may provision one or more particular sub-bands or particular sub-channels to each of the UEs for communication with the base station. In some aspects, the UEs may support different bandwidths on the channel. At least two UEs, of the plurality of UEs, may support different bandwidths on the channel.

At 1104, the base station may identify one or more sub-channels of the channel based at least in part on different RF chain capabilities of the plurality of UEs. For example, the base station may identify a set of sub-channels on which each of the UEs is capable of receiving a synchronization signal, and may identify the set of sub-channels as the one or more sub-channels. In some aspects, the one or more sub-channels may not overlap a particular sub-channel within which communications with the UEs are scheduled.

At 1106, the base station may transmit at least two synchronization signals in the one or more sub-channels of the channel. For example, the base station may transmit at least two synchronization signals in one or more sub-channels (e.g., one or more sub-bands of the channel). At least one sub-channel, of the one or more sub-channels, may not be centered in the channel. For example, the at least one sub-channel may not be located at a frequency center of the channel to permit each UE of the plurality of UEs to receive a synchronization signal on respective supported bandwidths of the plurality of UEs. In some aspects, the base station may transmit a single synchronization signal at a particular frequency, sub-channel, or bandwidth. In some aspects, the base station may transmit a plurality of synchronization signals at a plurality of different frequencies, sub-channels, and/or bandwidths. In such aspects, at least two sub-channels, of the plurality of sub-channels, may not overlap with each other.

At 1108, the base station may receive information identifying a particular RF chain capability associated with a particular UE. For example, UEs, of the plurality of UEs, may provide information identifying respective RF chain capabilities of the UEs. The RF chain capabilities may identify supported bandwidths, retuning capabilities, and/or the like. The base station may use the RF chain capabilities to schedule communications with the UEs, as described in more detail below.

In some aspects, an uplink communication associated with a particular UE, of the plurality of UEs, is associated with a first bandwidth of the channel, and a downlink communication associated with the particular UE is associated with a second bandwidth of the channel, wherein the first bandwidth is different than the second bandwidth. In some aspects, a bandwidth associated with a particular UE, of the plurality of UEs, is split between at least two sub-channels of the one or more sub-channels, wherein the at least two sub-channels are not adjacent.

At 1110, the base station may schedule communications with the particular UE in a particular sub-channel based at least in part on the particular RF chain capability. For example, the base station may schedule communications with the particular UE (and/or other UEs of the plurality of UEs) based at least in part on the particular RF chain capability associated with the particular UE. In some aspects, the base station may allocate uplink or downlink resources for the plurality of UEs based at least in part on the respective RF chain capabilities. Additionally, or alternatively, the base station may determine an amount of time associated with switching bandwidths based at least in part on the RF chain capabilities, and may schedule communications with the particular UE based at least in part on the amount of time.

Although FIG. 11 shows example blocks of a method of wireless communication, in some aspects, the method may include additional blocks, fewer blocks, different blocks, or differently arranged blocks than those shown in FIG. 11. Additionally, or alternatively, two or more blocks shown in FIG. 11 may be performed in parallel. Additionally, or alternatively, dashed outlines of certain blocks of FIG. 11 may indicate that the action or operation corresponding to the blocks is optional, and may or may not be performed by the base station in connection with process 1100.

Figure 12:
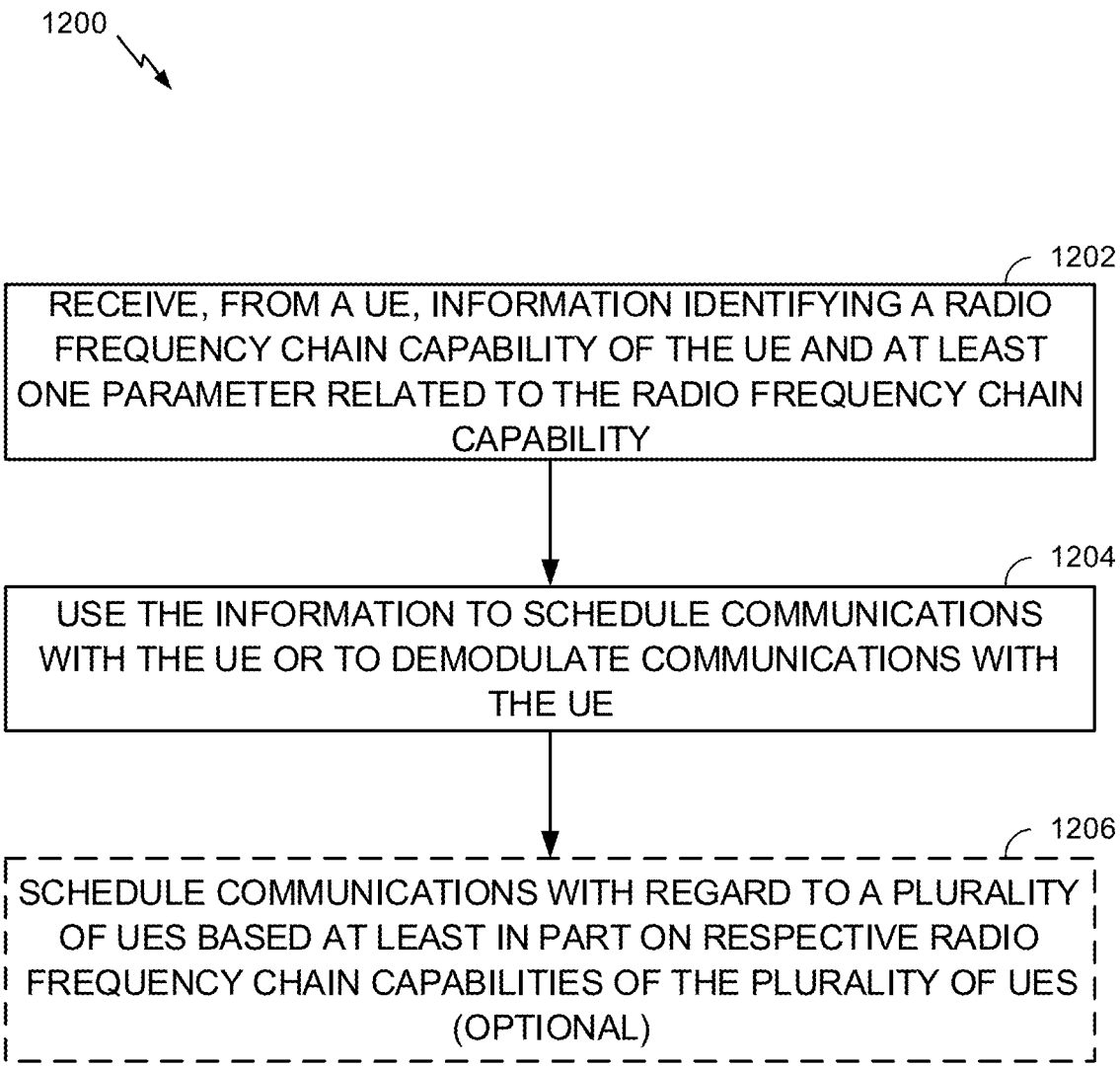
FIG. 12 is another flow chart of a method for wireless communication, in accordance with certain aspects of the present disclosure.

FIG. 12 is another flow chart of a method 1200 for wireless communication. The method 1200 may be performed by a base station (e.g., the base station 105 of FIG. 1) or a UE (e.g., the UE 115 of FIG. 1).

At 1202, the base station may receive, from a UE, information identifying an RF chain capability of the UE and at least one parameter related to the RF chain capability. The RF chain capability may include, for example, a total bandwidth capability of the UE, one or more respective bandwidth capabilities of one or more RF chains of the UE, and/or a contiguous bandwidth capability of the UE. For example, a particular RF chain capability may indicate that the UE includes four RF chains associated with a total bandwidth capability of 400 MHz, may identify respective RF chain bandwidth capabilities of 50 MHz, 100 MHz, 200 MHz, and 50 MHz associated with the four RF chains, and/or may identify a contiguous bandwidth capability of 200 MHz. The at least one parameter may identify information relating to the RF chain capability. For example, the at least one more parameter may identify a MIMO configuration of the UE, an advanced receiver configuration of the UE, and/or the like. In some aspects, the RF chain capability may identify a total bandwidth capability, and the at least one parameter may identify one or more respective bandwidth capabilities of one or more RF chains, a maximum contiguous bandwidth capability, a bandwidth capability distribution, or the like.

Additionally, or alternatively, the at least one parameter may identify a length of time associated with reconfiguration of the UE from a first bandwidth to a second bandwidth, a quantity of subframes and/or slots associated with reconfiguration of the UE from the first bandwidth to the second bandwidth, or the like. In such a case, the base station may use the at least one parameter to cause the UE to perform a switch from the first bandwidth to the second bandwidth at a particular time based at least in part on signaling, at an earlier time that precedes the particular time by the length of time, that the UE is to perform the switch to the second bandwidth. Additionally, or alternatively, the base station may use the at least one parameter to cause the UE to perform a switch from the first bandwidth to the second bandwidth at a particular time based at least in part on signaling that the UE is to perform the switch at the particular time. Additionally, or alternatively, the base station may use the at least one parameter to cause the UE to perform a switch from the first bandwidth to the second bandwidth at a particular time based at least in part on providing the second bandwidth to the UE at the particular time (e.g., when the UE is capable of dynamically reconfiguring bandwidth of the UE).

In some aspects, the information identifying the RF chain capability may identify a plurality of RF chain capabilities. In such a case, the at least one parameter may identify respective configurations, of a UE, corresponding to the plurality of RF chain capabilities. For example, the at least one parameter may indicate that a first RF chain capability when an advanced receiver is active on the UE, and may indicate a second RF chain capability when the advanced receiver is inactive.

At 1204, the base station may use the information (e.g., the information identifying the RF chain capability of the UE and the at least one parameter related to the RF chain capability) to schedule communications with the UE or to demodulate communications with the UE. In some aspects, the base station may schedule communications with the UE in a particular sub-channel of the channel based at least in part on the information. For example, a bandwidth of the particular sub-channel may correspond to (e.g., may be equal to) the RF chain capability of the UE.

At 1206, the base station may schedule communications with regard to a plurality of UEs based at least in part on respective RF chain capabilities of the plurality of UEs. For example, in some aspects, the information may relate to a plurality of UEs, and may identify respective RF chain capabilities of the plurality of UEs. In such a case, the base station may schedule communications with regard to the plurality of UEs based at least in part on the respective RF chain capabilities of the plurality of UEs. In some aspects, the base station may schedule the communications based at least in part on one or more of availability of part of or all of a channel associated with the plurality of UEs, power usage of one or more of the plurality of UEs, or a quantity of data associated with a buffer of one or more of the plurality of UEs.

Although FIG. 12 shows example blocks of a method of wireless communication, in some aspects, the method may include additional blocks, fewer blocks, different blocks, or differently arranged blocks than those shown in FIG. 12. Additionally, or alternatively, two or more blocks shown in FIG. 12 may be performed in parallel. Additionally, or alternatively, dashed outlines of certain blocks of FIG. 12 may indicate that the action or operation corresponding to the blocks is optional, and may or may not be performed by the base station in connection with process 1200.

Figure 13:
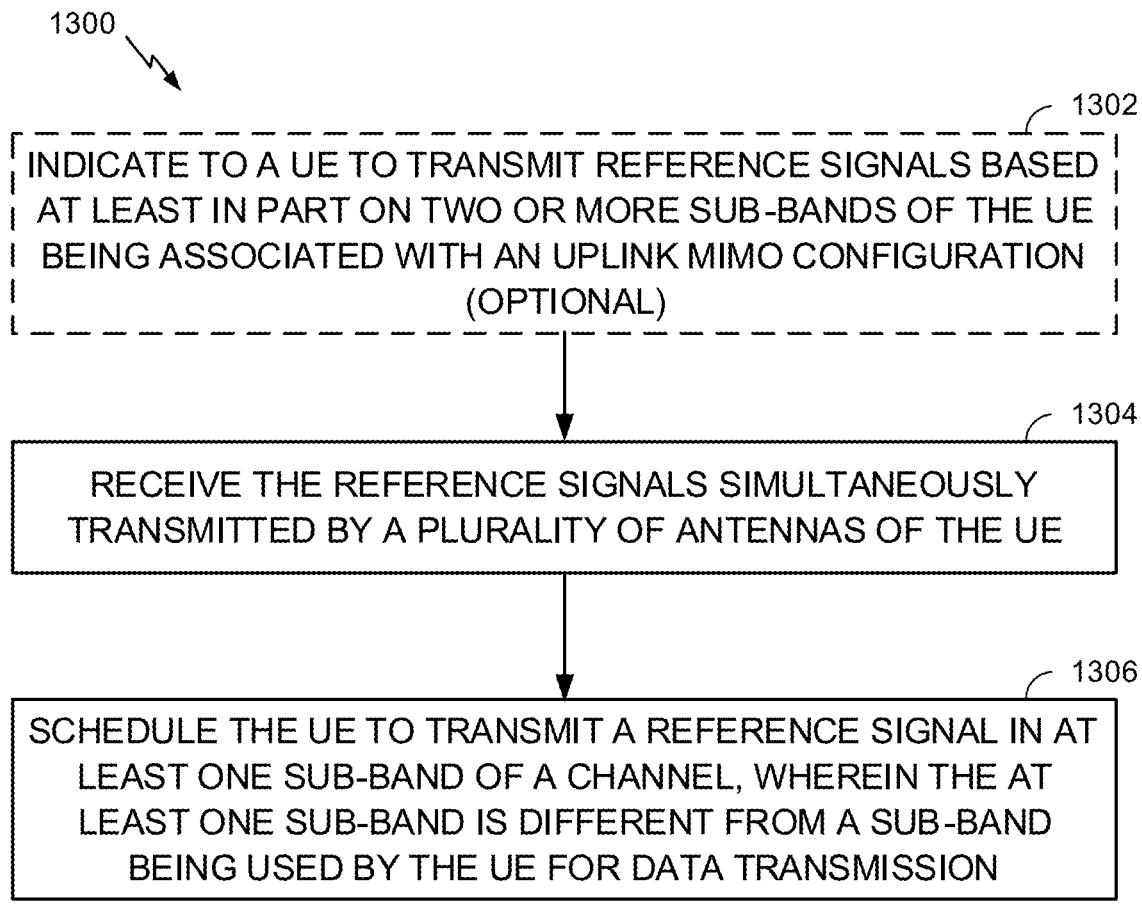
FIG. 13 is another flow chart of a method for wireless communication, in accordance with certain aspects of the present disclosure.

FIG. 13 is another flow chart of a method for wireless communication. The method 1300 may be performed by a base station (e.g., the base station 105 of FIG. 1) or a UE (e.g., the UE 115 of FIG. 1).

At 1302, the base station may indicate to a UE to transmit reference signals based at least in part on two or more sub-bands of the UE being associated with an uplink MIMO configuration. For example, a UE may have an uplink MIMO configuration, meaning that the UE may be capable of simultaneously transmitting a plurality of reference signals on respective sub-bands or sub-channels of a plurality of antennas associated with the uplink MIMO configuration. The base station may provide scheduling information indicating that the UE is to transmit the reference signals on the respective sub-bands or sub-channels. In such a case, the respective sub-bands or sub-channels may correspond to frequencies associated with the uplink MIMO configuration of the base station.

At 1304, the base station may receive the reference signals simultaneously transmitted by a plurality of antennas of a UE. For example, a plurality of antennas of a UE may simultaneously transmit reference signals (e.g., SRSs). The base station may receive the reference signals. In some aspects, the base station may use the reference signals to determine channel quality in the respective sub-bands or sub-channels in which the reference signals are transmitted. In this way, by configuring a single UE to transmit a plurality of reference signals, the base station improves efficiency of determining channel information.

At 1306, the base station may schedule the UE to transmit a reference signal in at least one sub-band of a channel wherein the at least one sub-band is different from a sub-band being used by the UE for data transmission. The at least one sub-band may correspond to one or more of the respective sub-bands or sub-channels described in connection with block 1302, above. By causing the UE to transmit one or more reference signals in the at least one sub-band, the base station improves versatility of the reference signaling process. Furthermore, the base station enables simultaneous testing of multiple different sub-bands, such as sub-bands not associated with a data connection to a UE, which improves accuracy and utility of testing information derived from the reference signals.

Although FIG. 13 shows example blocks of a method of wireless communication, in some aspects, the method may include additional blocks, fewer blocks, different blocks, or differently arranged blocks than those shown in FIG. 13. Additionally, or alternatively, two or more blocks shown in FIG. 13 may be performed in parallel.

Figure 14:
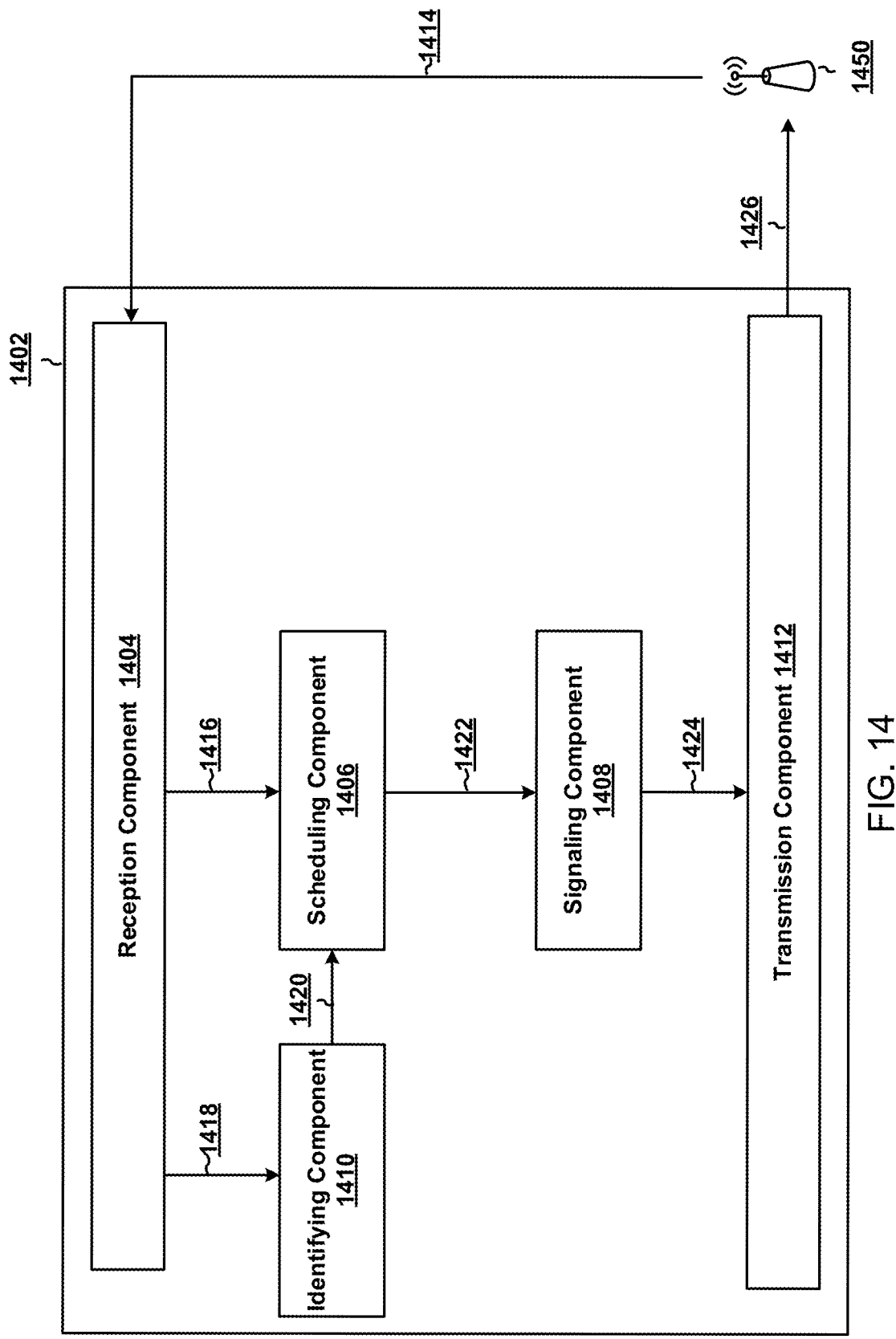
FIG. 14 is a conceptual data flow diagram illustrating the data flow between different modules/means/components in an example apparatus, in accordance with certain aspects of the present disclosure.

FIG. 14 is a conceptual data flow diagram illustrating the data flow between different modules/means/components in an example apparatus 1402. In some aspects, the apparatus 1402 may be a base station (e.g., which may correspond to the base station 105 of FIG. 1). In some aspects, the apparatus 1402 may be a UE (e.g., which may correspond to the UE 115 of FIG. 1). As shown, the apparatus 1402 may include a reception component 1404, a scheduling component 1406, a signaling component 1408, an identifying component 1410, and a transmission component 1412.

The reception component 1404 may receive data 1414, which may include information from a UE (e.g., which may correspond to the UE 115 of FIG. 1). For example, the reception component 1404 may receive information described in connection with FIGS. 9A-9C and/or FIGS. 10-13, such as information associated with an RF chain capability of the UE, reference signals transmitted by the UE, or the like. As shown, the reception component 1404 may provide data 1414 (e.g., which may be processed by the reception component 1404) as output to the scheduling component 1406 (e.g., as data 1416).

The scheduling component 1406 may receive data 1416 from the reception component 1404. Based at least in part on data 1416, the scheduling component 1406 may schedule communications with the UE and/or reference signals to be transmitted by the UE.

The reception component 1404 may provide data 1418 to the identifying component 1410. The data 1418 may identify different RF chain capabilities of a plurality of UEs. The identifying component 1410 may identify a channel that supports communications with the plurality of UEs. The identifying component 1410 may provide data 1420, identifying the channel, to the scheduling component 1406. The scheduling component 1406 may identify at least one synchronization signal to be transmitted on the channel by the base station based at least in part on the data 1420.

The scheduling component 1406 may provide data 1422 to the signaling component 1408. The data 1422 may identify scheduling information, reference signals to be transmitted by the UE, and/or a synchronization signal to be transmitted by the base station. In some aspects, the signaling component 1408 may determine, based on the data 1422, that the base station is to signal that the UE is to perform a switch from a first bandwidth to the second bandwidth. The signaling component 1408 may provide data 1424 to the transmission component 1412. The data 1424 may identify the scheduling information, the reference signals to be transmitted by the UE, and/or the synchronization signal, and the transmission component 1412 may use data 1424 to interact with the UE.

The apparatus 1402 may include additional components that perform each of the blocks of the algorithm in the aforementioned flow charts of FIGS. 11-13. As such, each block in the aforementioned flow charts of FIGS. 11-13 may be performed by a component, and the apparatus 1402 may include one or more of those components. The components may be one or more hardware components specifically configured to carry out the stated processes/algorithm, implemented by a processor configured to perform the stated processes/algorithm, stored within a non-transitory computer-readable medium for implementation by a processor, or some combination thereof.

Figure 15:
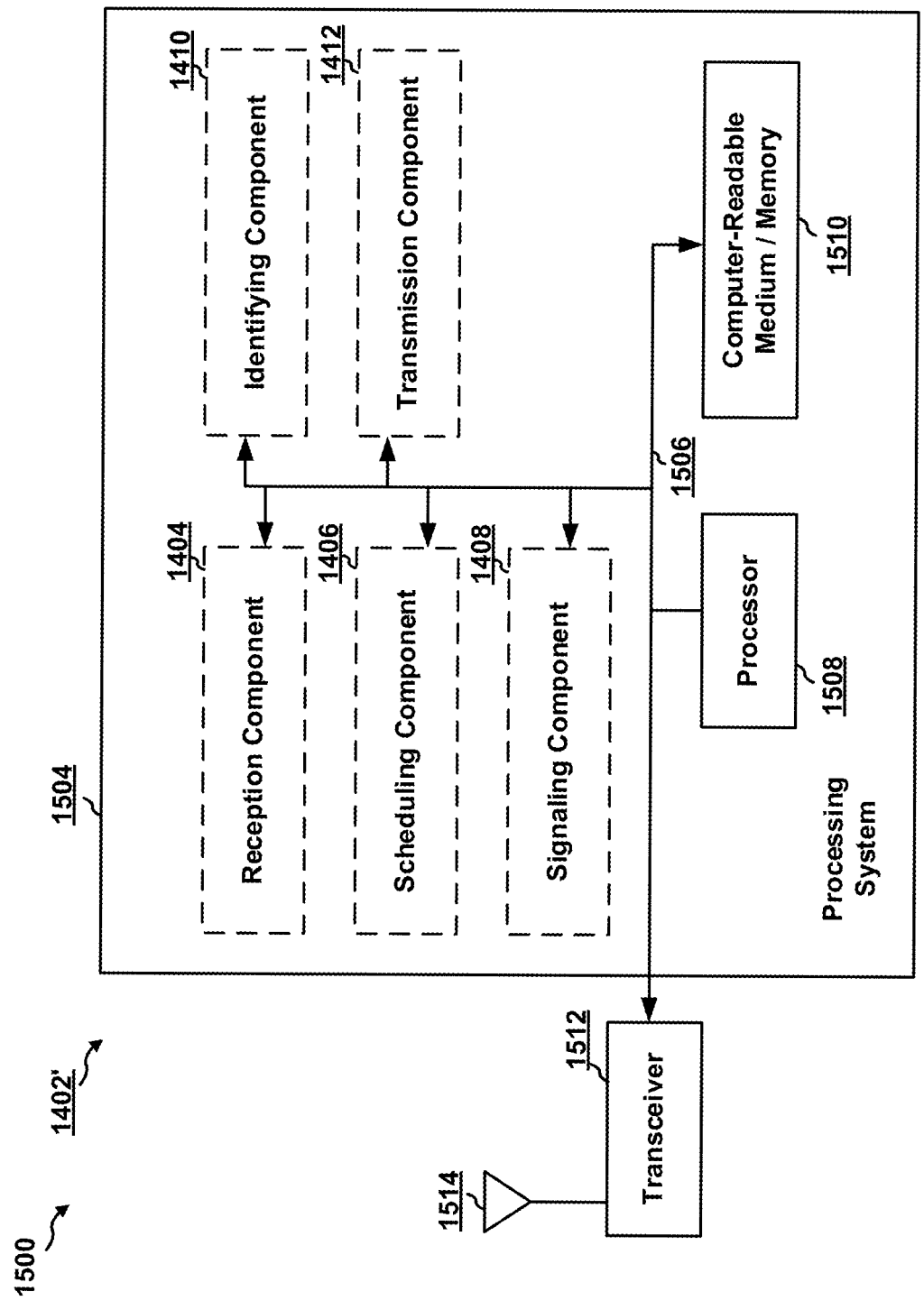
FIG. 15 is a diagram illustrating an example of a hardware implementation for an apparatus employing a processing system, in accordance with certain aspects of the present disclosure.

FIG. 15 is a diagram illustrating an example of a hardware implementation 1500 for an apparatus 1402' employing a processing system 1504. In some aspects, the apparatus 1402' may be a base station (e.g., which may correspond to the base station 105 of FIG. 1). In some aspects, the apparatus 1402' may be a UE (e.g., which may correspond to the UE 115 of FIG. 1).

The processing system 1504 may be implemented with a bus architecture, represented generally by a bus 1506. The bus 1506 may include any number of interconnecting buses and bridges depending on the specific application of the processing system 1504 and the overall design constraints. The bus 1506 links together various circuits, including one or more processors and/or hardware modules, represented by a processor 1508, a computer-readable medium/memory 1510, a transceiver 1512, one or more antennas 1514, and the components 1404, 1406, 1408, 1410, and 1412. The bus 1506 may also link various other circuits such as timing sources, peripherals, voltage regulators, and power management circuits, which are well known in the art, and therefore, will not be described any further.

The processing system 1504 may be coupled to a transceiver 1512. The transceiver 1512 is coupled to one or more antennas 1514. The transceiver 1512 provides a means for communicating with various other apparatus over a transmission medium. The transceiver 1512 receives a signal from the one or more antennas 1514, extracts information from the received signal, and provides the extracted information to the processing system 1504, specifically the reception component 1404. In addition, the transceiver 1512 receives information from the processing system 1504, specifically the transmission component 1412, and based at least in part on the received information, generates a signal to be applied to the one or more antennas 1514. The processing system 1504 includes a processor 1508 coupled to a computer-readable medium/memory 1510. The processor 1508 is responsible for general processing, including the execution of software stored on the computer-readable medium/memory 1510. The software, when executed by the processor 1508, causes the processing system 1504 to perform the various functions described supra for any particular apparatus. The computer-readable medium/memory 1510 may also be used for storing data that is manipulated by the processor 1508 when executing software. The processing system 1504 further includes at least one of the components 1404, 1406, 1408, 1410, and/or 1412. The components may be software modules running in the processor 1508, resident/stored in the computer readable medium/memory 1510, one or more hardware components coupled to the processor 1508, or some combination thereof. The processing system 1504 may be a component of the BS 105 and may include the memory 342 and/or at least one of the transmit processor 320, the receive processor 338, and the controller/processor 340.

In one configuration, the apparatus 1402' for wireless communication includes means for identifying a channel that supports communications with a plurality of UEs, means for identifying one or more sub-channels of the channel based at least in part on different RF chain capabilities of the plurality of UEs, means for transmitting at least two synchronization signals in one or more sub-channels of the channel, means for receiving information identifying an RF chain capability of the UE and at least one parameter related to the RF chain capability, means for receiving information identifying a particular RF chain capability associated with a particular UE, means for using the information to schedule communications with the UE or to demodulate communications with the UE, means for scheduling communications with regard to the plurality of UEs based at least in part on respective RF chain capabilities of the plurality of UEs, means for indicating to a UE to transmit reference signals based at least in part on two or more sub-bands of the UE being associated with an uplink MIMO configuration, means for receiving reference signals simultaneously transmitted by a plurality of antennas of the UE, and/or means for scheduling the UE to transmit a reference signal in a particular sub-band of a channel that is different than a sub-band being used by the UE for data transmission. The aforementioned means may be one or more of the aforementioned modules of the apparatus 1402 and/or the processing system 1504 of the apparatus 1402' configured to perform the functions recited by the aforementioned means. As described supra, the processing system 1504 may include the transmit processor 320, the receive processor 338, and/or the controller/processor 340. As such, in one configuration, the aforementioned means may be the transmit processor 320, the receive processor 338, and/or the controller/processor 340 configured to perform the functions recited by the aforementioned means.

Figure 16:
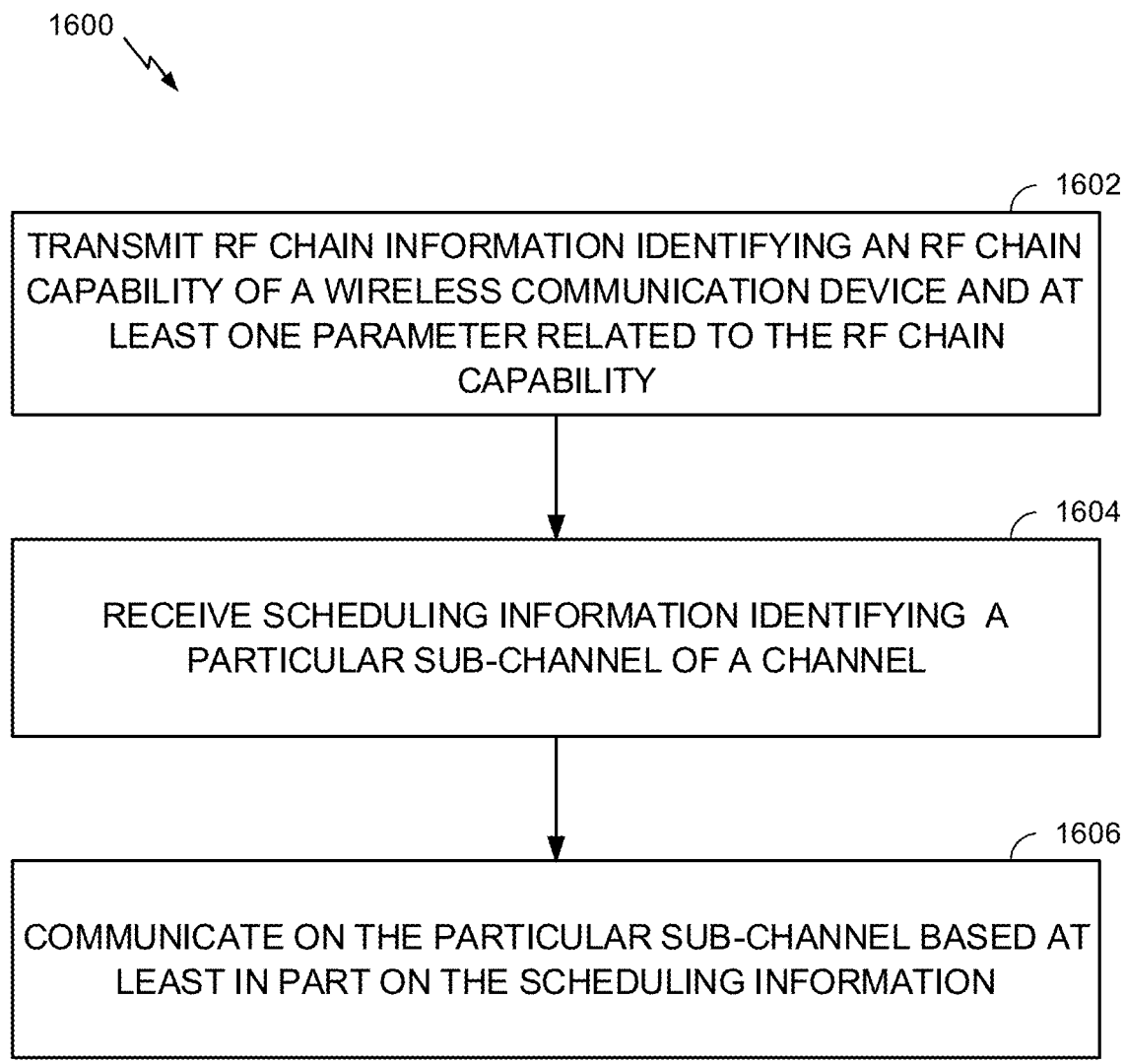
FIG. 16 is another flow chart of a method for wireless communication, in accordance with certain aspects of the present disclosure.

FIG. 16 is another flow chart of a method 1600 for wireless communication. The method 1600 may be performed by a wireless communication device (e.g., the UE 115 of FIG. 1).

At 1602, the wireless communication device may transmit RF chain information identifying an RF chain capability of the wireless communication device and at least one parameter related to the RF chain capability. For example, the wireless communication device may transmit RF chain information identifying an RF chain capability of the wireless communication device. In some aspects, the wireless communication device may transmit at least one parameter associated with the RF chain capability. For example, in some aspects, the RF chain capability is one of a plurality of RF chain capabilities identified by the RF chain information, and the at least one parameter identifies respective multiple-input multiple-output (MIMO) configurations corresponding to the plurality of RF chain capabilities. In some aspects, the RF chain information may identify a bandwidth capability of the wireless communication device. In some aspects, the RF chain information may be transmitted on a particular bandwidth that is narrower than a communication bandwidth of the wireless communication device.

In some aspects, the at least one parameter may identify one or more of a length of time associated with reconfiguration of the wireless communication device from a first bandwidth to a second bandwidth, or a quantity of subframes and/or slots associated with reconfiguration of the wireless communication device from the first bandwidth to the second bandwidth.

At 1604, the wireless communication device may receive scheduling information identifying a particular sub-channel of a channel, wherein the channel supports communications with a plurality of wireless communication devices based at least in part on respective RF chain capabilities of the plurality of wireless communication devices. For example, the wireless communication device may receive scheduling information from a base station. The scheduling information may identify a particular sub-channel of a channel. The channel may support communications with the plurality of wireless communication devices (e.g., including the wireless communication device) based at least in part on respective RF chain capabilities of the plurality of wireless communication devices.

At 1606, the wireless communication device may communicate on the particular sub-channel based at least in part on the scheduling information. In some aspects, the wireless communication device may perform a switch from the first bandwidth to the second bandwidth at a particular time. The switch may be based at least in part on one or more of signaling, at an earlier time that precedes the particular time by the length of time, that indicates that the wireless communication device is to perform the switch to the second bandwidth, signaling that indicates that the wireless communication device is to perform the switch at the particular time, or receiving, by the wireless communication device, an allocation of the second bandwidth at the particular time when the wireless communication device is capable of dynamically reconfiguring bandwidth of the wireless communication device.

Although FIG. 16 shows example blocks of a method of wireless communication, in some aspects, the method may include additional blocks, fewer blocks, different blocks, or differently arranged blocks than those shown in FIG. 16. Additionally, or alternatively, two or more blocks shown in FIG. 16 may be performed in parallel.

Figure 17:
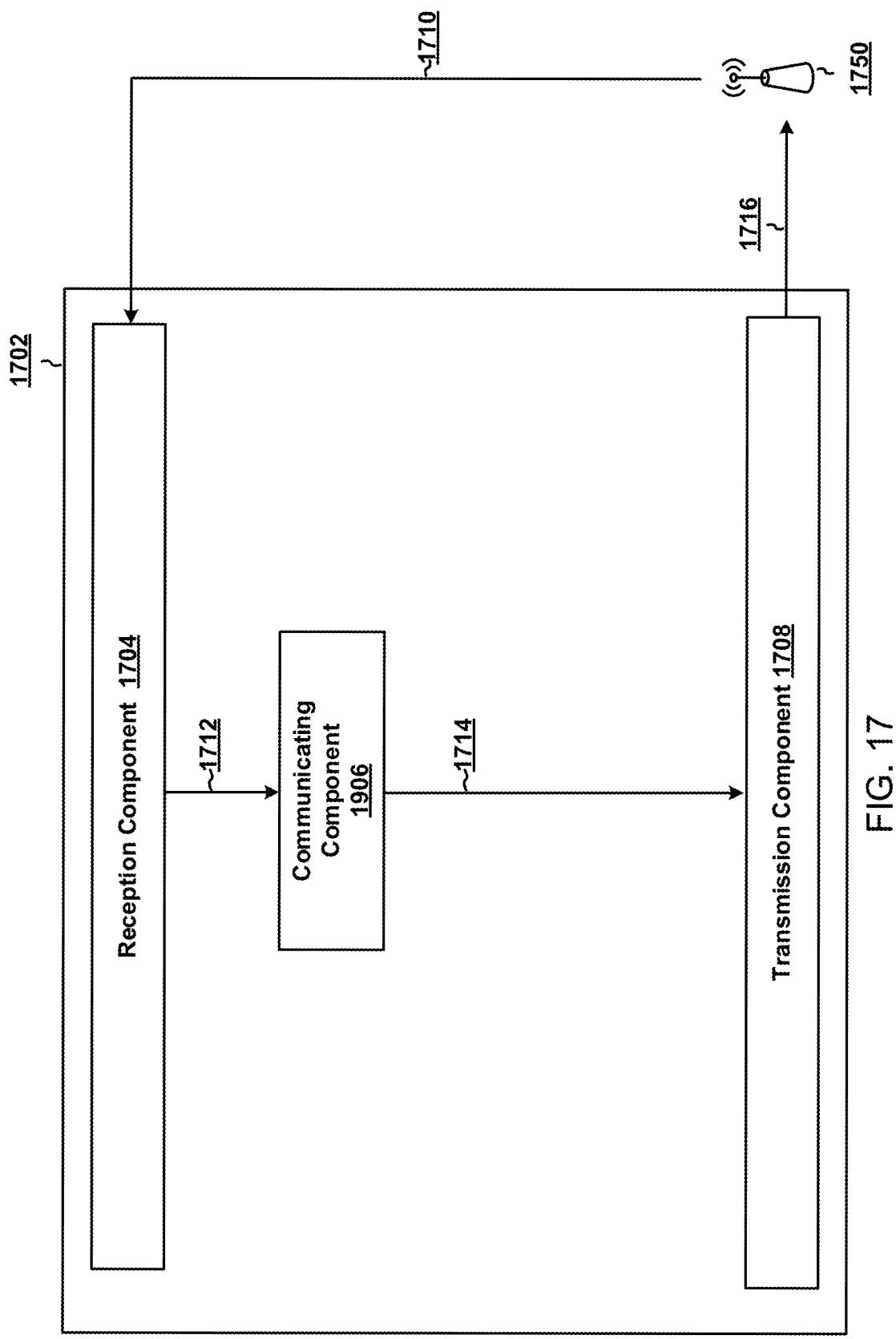
FIG. 17 is a conceptual data flow diagram illustrating the data flow between different modules/means/components in an example apparatus, in accordance with certain aspects of the present disclosure.

FIG. 17 is a conceptual data flow diagram illustrating the data flow between different modules/means/components in an example apparatus 1702. In some aspects, the apparatus 1702 may be a wireless communication device (e.g., which may correspond to the UE 115 of FIG. 1). In some aspects, the apparatus 1702 may be a UE (e.g., which may correspond to the UE 115 of FIG. 1). As shown, the apparatus 1702 may include a reception component 1704, a communicating component 1706, and a transmission component 1708.

The reception component 1704 may receive data 1710, which may include scheduling information identifying a particular sub-channel of a channel. In some aspects, the data 1710 may be based at least in part on information transmitted by transmission component 1708, as described in more detail below. For example, the reception component 1704 may receive information described in connection with FIGS. 9A-9C, FIGS. 10-13, and/or FIG. 16, such as scheduling information indicating a bandwidth allocation and/or a manner in which to communicate with regard to the bandwidth allocation, or the like. As shown, the reception component 1704 may provide data 1710 (e.g., which may be processed by the reception component 1704) as output to the communicating component 1706 (e.g., as data 1712).

The communicating component 1706 may receive data 1712 from the reception component 1704. Based at least in part on data 1712, the communicating component 1706 may communicate on the particular sub-channel. In some aspects, the communicating component 1706 may provide data 1714 to the transmission component 1708 to be transmitted to a wireless communication device 1750 (e.g., an eNB 105 and/or the like) based at least in part on the data 1712.

In some aspects, the transmission component 1708 may provide data 1716 to the wireless communication device 1750. For example, the data 1716 may include RF chain information identifying an RF chain capability of the apparatus 1702 and at least one parameter related to the RF chain capability. In such a case, the wireless communication device 1750 may generate data 1710 based at least in part on the data 1716.

The apparatus 1702 may include additional components that perform each of the blocks of the algorithm in the aforementioned flow charts of FIGS. 11-13 and/or 16. As such, each block in the aforementioned flow charts of FIGS. 11-13 and/or 16 may be performed by a component, and the apparatus 1702 may include one or more of those components. The components may be one or more hardware components specifically configured to carry out the stated processes/algorithm, implemented by a processor configured to perform the stated processes/algorithm, stored within a non-transitory computer-readable medium for implementation by a processor, or some combination thereof.

Figure 18:
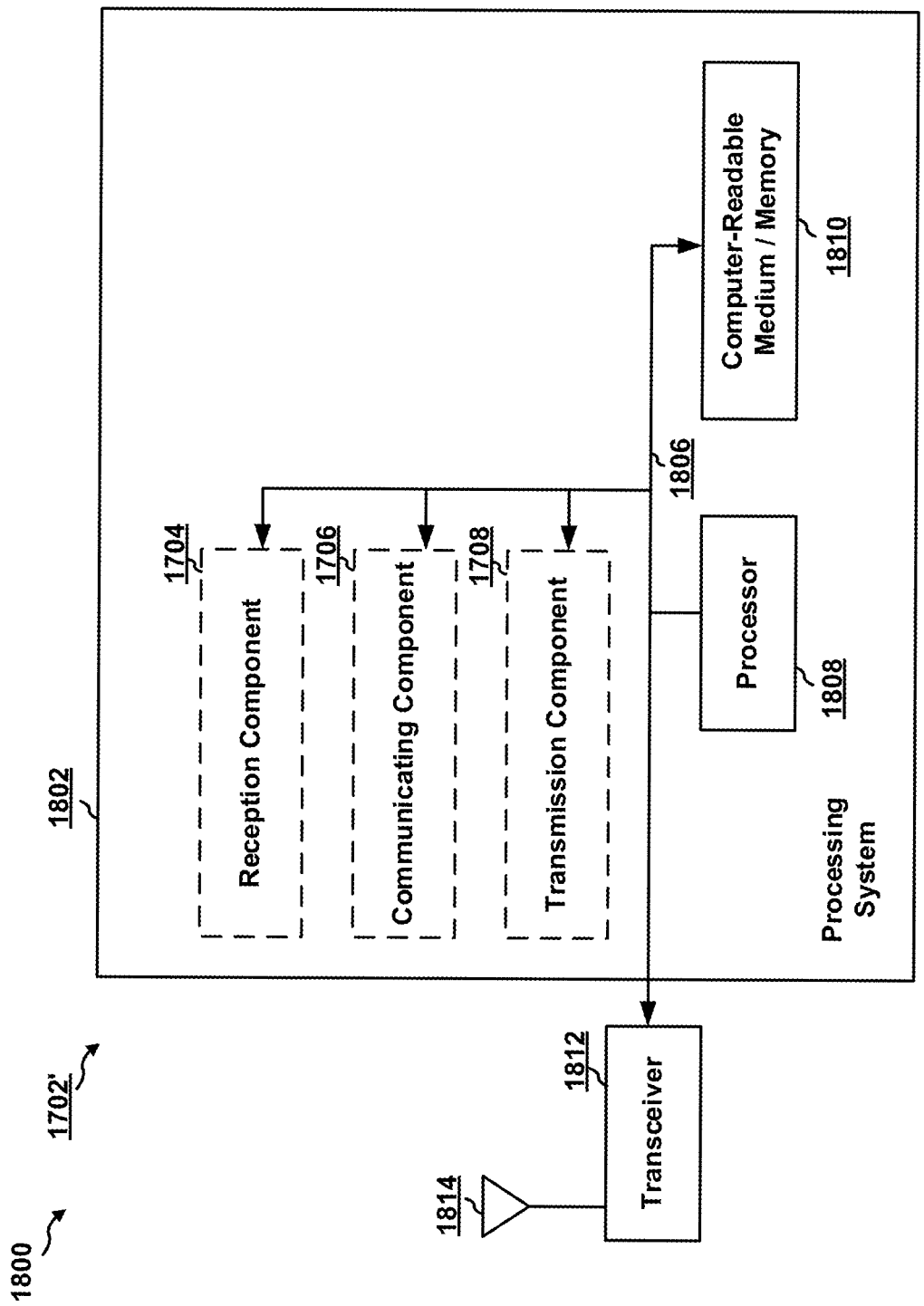
FIG. 18 is a diagram illustrating an example of a hardware implementation for an apparatus employing a processing system, in accordance with certain aspects of the present disclosure.

FIG. 18 is a diagram illustrating an example of a hardware implementation 1800 for an apparatus 1702' employing a processing system 1802. In some aspects, the apparatus 1702' may be a UE (e.g., which may correspond to the UE 115 of FIG. 1).

The processing system 1802 may be implemented with a bus architecture, represented generally by a bus 1806. The bus 1806 may include any number of interconnecting buses and bridges depending on the specific application of the processing system 1802 and the overall design constraints. The bus 1806 links together various circuits, including one or more processors and/or hardware modules, represented by a processor 1808, a computer-readable medium/memory 1810, a transceiver 1812, one or more antennas 1814, and the components 1704, 1706, 1708, 1710, and 1712. The bus 1806 may also link various other circuits such as timing sources, peripherals, voltage regulators, and power management circuits, which are well known in the art, and therefore, will not be described any further.

The processing system 1802 may be coupled to a transceiver 1812. The transceiver 1812 is coupled to one or more antennas 1814. The transceiver 1812 provides a means for communicating with various other apparatus over a transmission medium. The transceiver 1812 receives a signal from the one or more antennas 1814, extracts information from the received signal, and provides the extracted information to the processing system 1802, specifically the reception component 1704. In addition, the transceiver 1812 receives information from the processing system 1802, specifically the transmission component 1712, and based at least in part on the received information, generates a signal to be applied to the one or more antennas 1814. The processing system 1802 includes a processor 1808 coupled to a computer-readable medium/memory 1810. The processor 1808 is responsible for general processing, including the execution of software stored on the computer-readable medium/memory 1810. The software, when executed by the processor 1808, causes the processing system 1802 to perform the various functions described supra for any particular apparatus. The computer-readable medium/memory 1810 may also be used for storing data that is manipulated by the processor 1808 when executing software. The processing system 1802 further includes at least one of the components 1704, 1706, and/or 1708. The components may be software modules running in the processor 1808, resident/stored in the computer readable medium/memory 1810, one or more hardware components coupled to the processor 1808, or some combination thereof. The processing system 1802 may be a component of the UE 115 and may include the memory 382 and/or at least one of the transmit processor 364, the receive processor 358, and the controller/processor 380.

In one configuration, the apparatus 1702' for wireless communication includes means for identifying a channel that supports communications with a plurality of UEs, means for transmitting at least one synchronization signal in one or more sub-channels of the channel, means for receiving information identifying an RF chain capability of the UE and at least one parameter related to the RF chain capability, means for using the information to schedule communications with the UE or to demodulate communications with the UE, means for receiving reference signals simultaneously transmitted by a plurality of antennas of a UE, and/or means for scheduling the UE to transmit a reference signal in a particular sub-band of a channel that is different than a sub-band within which the UE communicates. The aforementioned means may be one or more of the aforementioned modules of the apparatus 1702 and/or the processing system 1802 of the apparatus 1702' configured to perform the functions recited by the aforementioned means. As described supra, the processing system 1802 may include the transmit processor 364, the receive processor 358, and the controller/processor 380. As such, in one configuration, the aforementioned means may be the transmit processor 364, the receive processor 358, and the controller/processor 380 configured to perform the functions recited by the aforementioned means.

It is understood that the specific order or hierarchy of blocks in the processes/flow charts disclosed is an illustration of example approaches. Based upon design preferences, it is understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication, comprising:
   identifying, by a network device, a channel that supports communications with a plurality of user equipment (UEs),
      wherein at least two UEs, of the plurality of UEs, support different bandwidths on the channel;
   transmitting, by the network device, at least two synchronization signals to the at least two UEs,
      wherein the at least two UEs do not support a bandwidth at a frequency center of the channel, and
      wherein at least one synchronization signal, of the at least two synchronization signals, is transmitted in one or more sub-channels of the channel that are not located at the frequency center of the channel to permit the at least two UEs to receive the at least one synchronization signal;
   receiving, by the network device, from the at least two UEs, and based at least in part on transmitting the at least two synchronization signals, first information identifying a first radio frequency (RF) chain capability of a first UE of the at least two UEs and second information identifying a second RF chain capability of a second UE of the at least two UEs,
      wherein the second RF chain capability is different from the first RF chain capability; and
   scheduling, by the network device, communications with regard to the first UE and the second UE based at least in part on the first RF chain capability and the second RF chain capability.

2. The method of claim 1, further comprising:
   identifying the one or more sub-channels based at least in part on different radio frequency (RF) chain capabilities of the plurality of UEs.

3. The method of claim 1, wherein the one or more sub-channels include a plurality of sub-channels,
   wherein at least two sub-channels, of the plurality of sub-channels, do not overlap with each other; and
   wherein transmitting the at least two synchronization signals comprises:

transmitting a respective synchronization signal, of the at least two synchronization signals, in the plurality of sub-channels.

4. The method of claim 1, wherein scheduling the communications comprises:
scheduling communications with the first UE in a particular sub-channel of the channel based at least in part on the first RF chain capability.

5. The method of claim 4, wherein a bandwidth of the particular sub-channel corresponds to the first RF chain capability.

6. The method of claim 4, wherein a bandwidth of the particular sub-channel is narrower than the first RF chain capability.

7. The method of claim 4, wherein the first RF chain capability identifies at least one of:
a total bandwidth capability of the first UE,
one or more respective bandwidth capabilities of one or more RF chains of the first UE, or
a contiguous bandwidth capability of the first UE.

8. The method of claim 4, wherein the particular sub-channel in which the communications are scheduled is different than the one or more sub-channels in which the at least one synchronization signal is transmitted.

9. The method of claim 1, wherein the at least one synchronization signal identifies one or more available sub-channels of the channel.

10. The method of claim 1, wherein the one or more sub-channels include a single sub-channel of the channel.

11. The method of claim 1, wherein an uplink communication associated with the first UE is associated with a first bandwidth of the channel; and
wherein a downlink communication associated with the first UE is associated with a second bandwidth of the channel,
wherein the first bandwidth is different than the second bandwidth.

12. The method of claim 1, wherein a bandwidth associated with the first UE is split between at least two sub-channels of the one or more sub-channels,
wherein the at least two sub-channels are not adjacent.

13. A method for wireless communication, comprising:
receiving, by a network device and from a first user equipment (UE), first information identifying a first radio frequency (RF) chain capability of the first UE;
receiving, by the network device and from a second UE, second information identifying a second RF chain capability of the second UE,
wherein the first UE and the second UE do not support a bandwidth at a frequency center of a channel associated with the first UE and the second UE, and
wherein the second RF chain capability is different from the first RF chain capability; and
scheduling, by the network device, communications with regards to the first UE and the second UE based at least in part on the first RF chain capability and the second RF chain capability.

14. The method of claim 13, wherein the first RF chain capability identifies one or more of:
a total bandwidth capability of the first UE,
one or more respective bandwidth capabilities associated with one or more RF chains of the first UE, or
a contiguous bandwidth capability of the first UE.

15. The method of claim 13,
wherein the first information identifying the first RF chain capability identifies a plurality of RF chain capabilities; and
wherein the method further comprises:
receiving information regarding at least one parameter that identifies configurations, of the first UE, corresponding to the plurality of RF chain capabilities.

16. The method of claim 13, further comprising:
receiving at least one parameter that identifies a multiple-input multiple-output (MIMO) configuration of the first UE.

17. The method of claim 13,
wherein the first RF chain capability is one of a plurality of RF chain capabilities identified by the first information, and
wherein the method further comprises:
receiving information regarding at least one parameter that identifies respective multiple-input multiple-output (MIMO) configurations corresponding to the plurality of RF chain capabilities.

18. The method of claim 13, wherein scheduling the communications comprises:
scheduling the communications based at least in part on the first RF chain capability, the second RF chain capability, and one or more of:
availability of part of or all of a channel associated with the first UE and the second UE,
power usage associated with the first UE and the second UE, or
a quantity of data associated with a buffer of one or more of the first UE and the second UE.

19. The method of claim 13, further comprising:
receiving at least one parameter related to the first RF chain capability,
wherein the at least one parameter identifies one or more of:
a length of time associated with reconfiguration of the first UE from a first bandwidth to a second bandwidth, or
a quantity of subframes and/or slots associated with reconfiguration of the first UE from the first bandwidth to the second bandwidth; and
wherein scheduling the communications comprises:
scheduling the communications based at least in part on the first RF chain capability, the second RF chain capability, and one or more of:
the length of time, or
the quantity of subframes and/or slots.

20. The method of claim 13, wherein scheduling the communications comprises causing the first UE to perform a switch from a first bandwidth to a second bandwidth at a particular time based at least in part on the first RF chain capability and one or more of:
signaling, at an earlier time that precedes a particular time by a length of time, that the first UE is to perform the switch to the second bandwidth,
signaling that the first UE is to perform the switch at the particular time, or
making the second bandwidth available to the first UE at the particular time when the first UE is capable of dynamically reconfiguring bandwidth of the first UE.

21. The method of claim 13, wherein the first information identifying the first RF chain capability is transmitted via a particular bandwidth,
the particular bandwidth being narrower than a communication bandwidth within which the communications are scheduled, and
the particular bandwidth being used for control signaling of the first UE.

22. A wireless communication device comprising:
a memory; and
at least one processor operatively coupled to the memory, the at least one processor configured to:
    transmit, to a base station, radio frequency (RF) chain information identifying a first RF chain capability of the wireless communication device and at least one parameter related to the first RF chain capability;
    receive, from the base station, scheduling information identifying a particular sub-channel of a channel,
        wherein the channel supports communications with the wireless communication device and a different wireless communication device based at least in part on the first RF chain capability and a second RF chain capability of the different wireless communication device,
        wherein the wireless communication device and the different wireless communication device do not support a bandwidth at a frequency center of the channel, and
        wherein the second RF chain capability is different from the first RF chain capability; and
    communicate on the particular sub-channel based at least in part on the scheduling information,
        wherein the wireless communication device, when communicating on the particular sub-channel, is to perform a switch from a first bandwidth to a second bandwidth based at least in part on one or more of:
            signaling that indicates that the wireless communication device is to perform the switch to the second bandwidth,
            signaling that indicates that the wireless communication device is to perform the switch at a particular time, or
            receiving, by the wireless communication device, an allocation of the second bandwidth when the wireless communication device is capable of dynamically reconfiguring bandwidth of the wireless communication device.

23. The wireless communication device of claim 22, wherein the first RF chain capability is one of a plurality of RF chain capabilities identified by the RF chain information; and
    wherein the at least one parameter identifies respective multiple-input multiple-output (MIMO) configurations corresponding to the plurality of RF chain capabilities.

24. The wireless communication device of claim 22, wherein the at least one parameter identifies one or more of:
    a length of time associated with reconfiguration of the wireless communication device from a first bandwidth to a second bandwidth, or
    a quantity of subframes and/or slots associated with reconfiguration of the wireless communication device from the first bandwidth to the second bandwidth.

25. The wireless communication device of claim 22, wherein the wireless communication device, when performing the switch from the first bandwidth to the second bandwidth, is to perform the switch from the first bandwidth to the second bandwidth based at least in part on signaling, at an earlier time that precedes the particular time by a length of time associated with reconfiguration of the wireless communication device from the first bandwidth to the second bandwidth, that indicates that the wireless communication device is to perform the switch to the second bandwidth.

26. A network device comprising:
a memory; and
at least one processor operatively coupled to the memory, the at least one processor configured to:
    identify a channel that supports communications with a plurality of user equipment (UEs),
        wherein at least two UEs, of the plurality of UEs, support different bandwidths on the channel;
    transmit at least two synchronization signals,
        wherein the at least two UEs do not support a bandwidth at a frequency center of the channel, and
        wherein at least one synchronization signal, of the at least two synchronization signals, is transmitted in one or more sub-channels of the channel that are not located at the frequency center of the channel to permit the at least two UEs to receive the at least one synchronization signal;
    receive, from the at least two UEs and based at least in part on transmitting the at least two synchronization signals, first information identifying a first radio frequency (RF) chain capability of a first UE of the at least two UEs, and second information identifying a second RF chain capability of a second UE of the at least two UEs; and
    schedule communications with regard to the first UE and the second UE based at least in part on the first RF chain capability and the second RF chain capability,
        wherein the second RF chain capability is different from the first RF chain capability.

27. The network device of claim 26,
wherein the one or more sub-channels include a plurality of sub-channels,
wherein at least two sub-channels, of the plurality of sub-channels, do not overlap with each other, and
wherein a synchronization signal, of the at least two synchronization signals, is transmitted in the plurality of sub-channels.

28. The network device of claim 26, wherein the at least one synchronization signal identifies one or more available sub-channels of the channel.

29. The network device of claim 26, wherein an uplink communication associated with the first UE is associated with a first bandwidth of the channel; and
    wherein a downlink communication associated with the first UE is associated with a second bandwidth of the channel, and
    wherein the first bandwidth is different than the second bandwidth.

30. The wireless communication device of claim 22, wherein the at least one processor is further configured to:
    receive a synchronization signal from a network device via one or more sub-channels of a channel that are not located at a frequency center of the channel,
        wherein the RF chain information is transmitted based at least in part on receiving the synchronization signal.

* * * * *